Feb. 13, 1940.  T. F. CHEEK ET AL  2,190,256
AUTOMATIC GEAR SHIFTING MECHANISM
Filed April 9, 1935  9 Sheets-Sheet 1

Inventors
Tolbert F. Cheek
Louis G. Collyer
By C. J. Stockman
Attorney

Feb. 13, 1940. T. F. CHEEK ET AL 2,190,256
AUTOMATIC GEAR SHIFTING MECHANISM
Filed April 9, 1935 9 Sheets-Sheet 2

Inventors
Tolbert F. Cheek
Louis G. Collyer
By C. J. Stockman
Attorney

Feb. 13, 1940. T. F. CHEEK ET AL 2,190,256
AUTOMATIC GEAR SHIFTING MECHANISM
Filed April 9, 1935 9 Sheets-Sheet 3
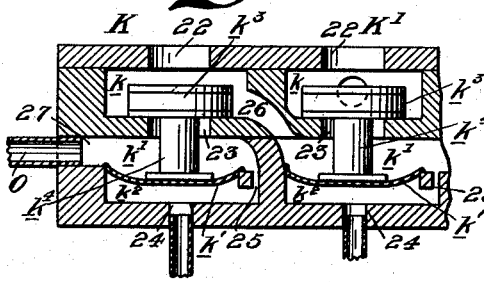
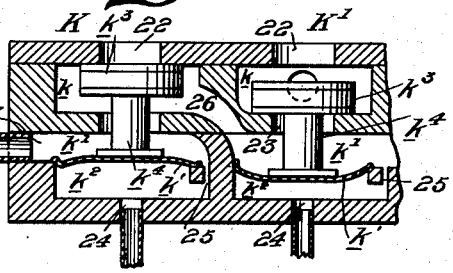
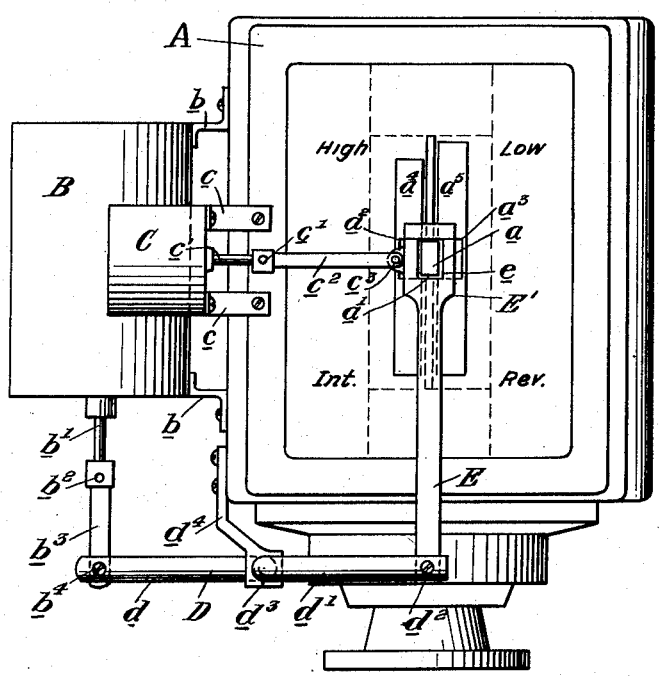
Inventors
Tolbert F. Cheek
Louis G. Collyer
By C. J. Stockman
Attorney

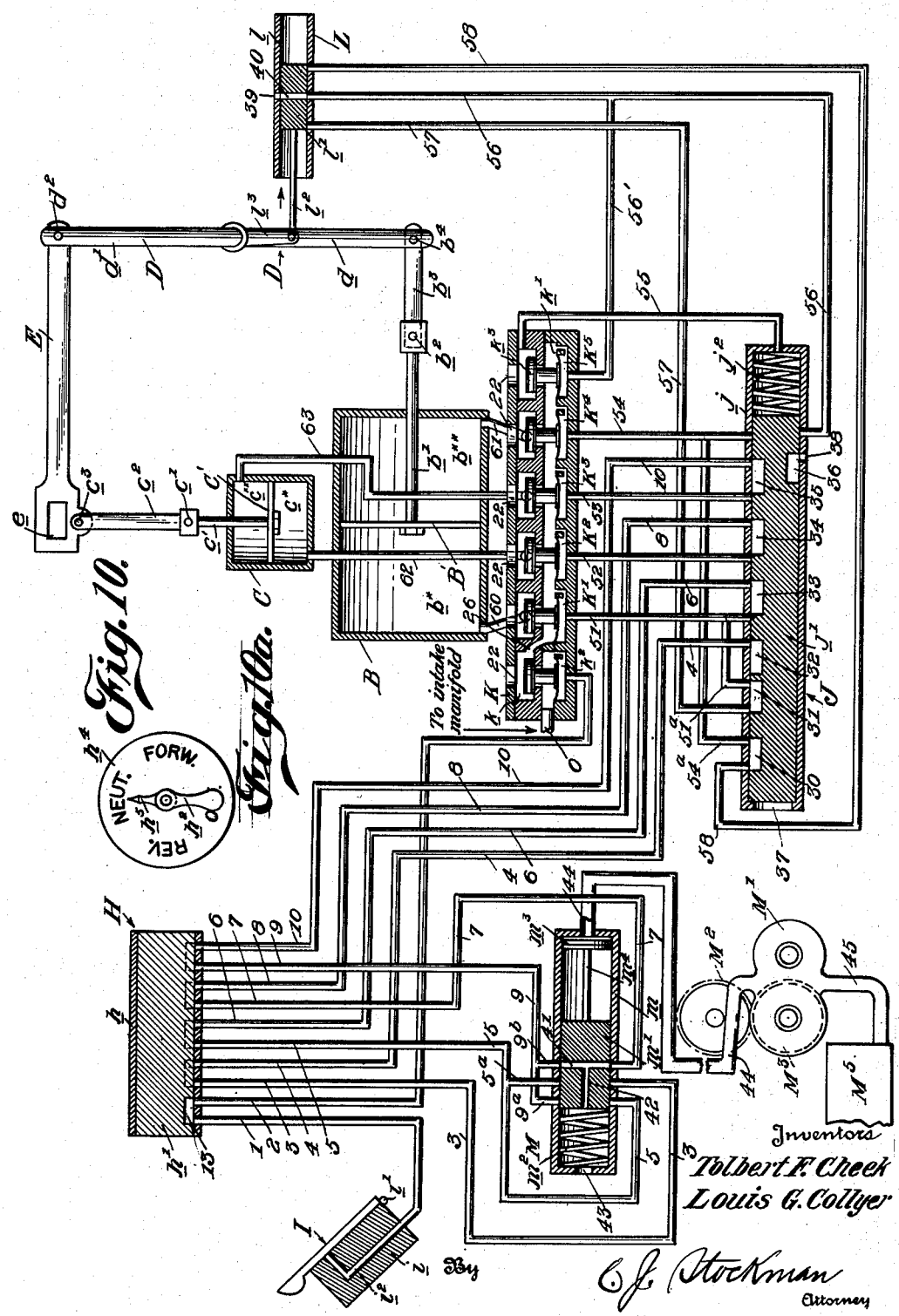

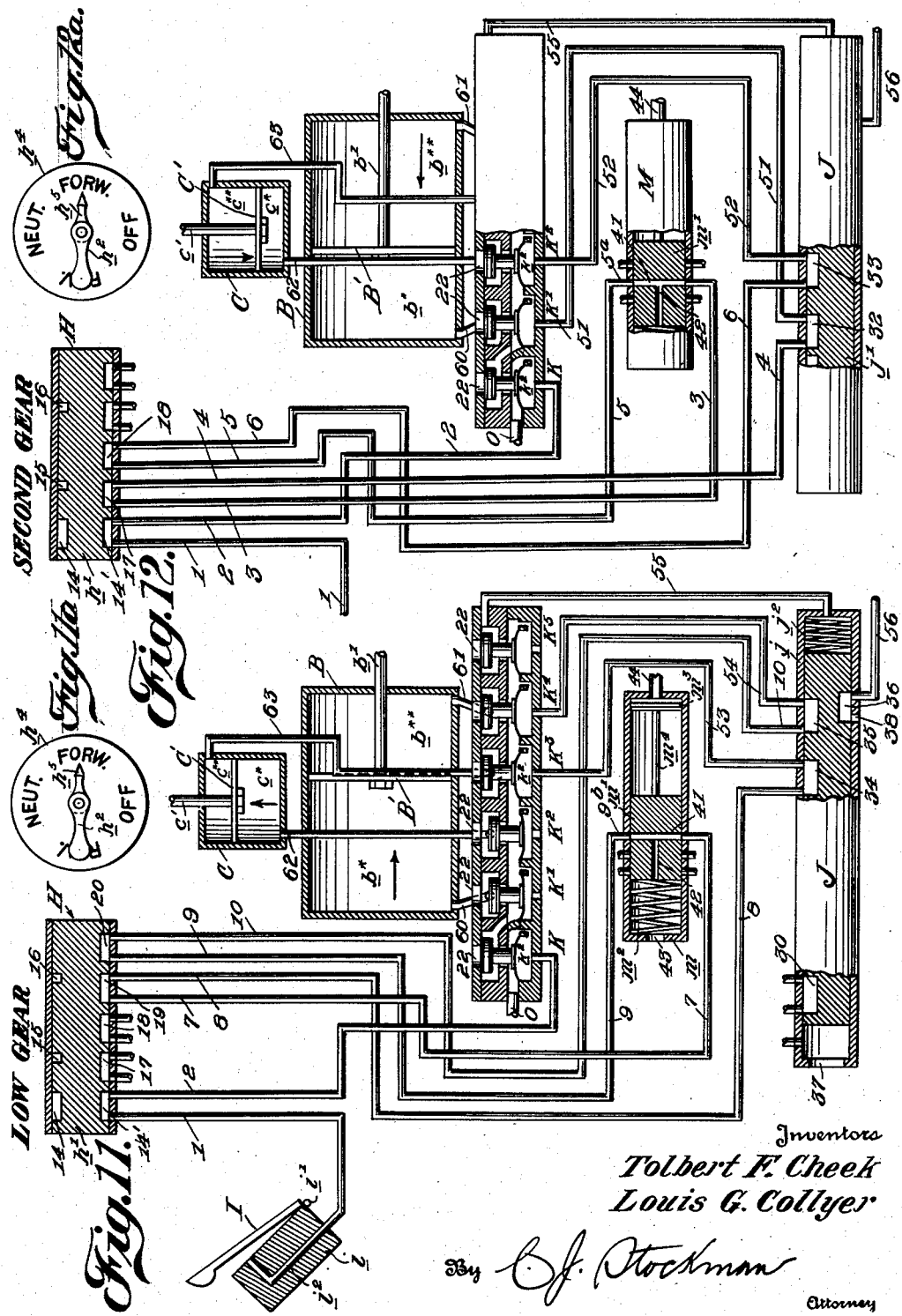

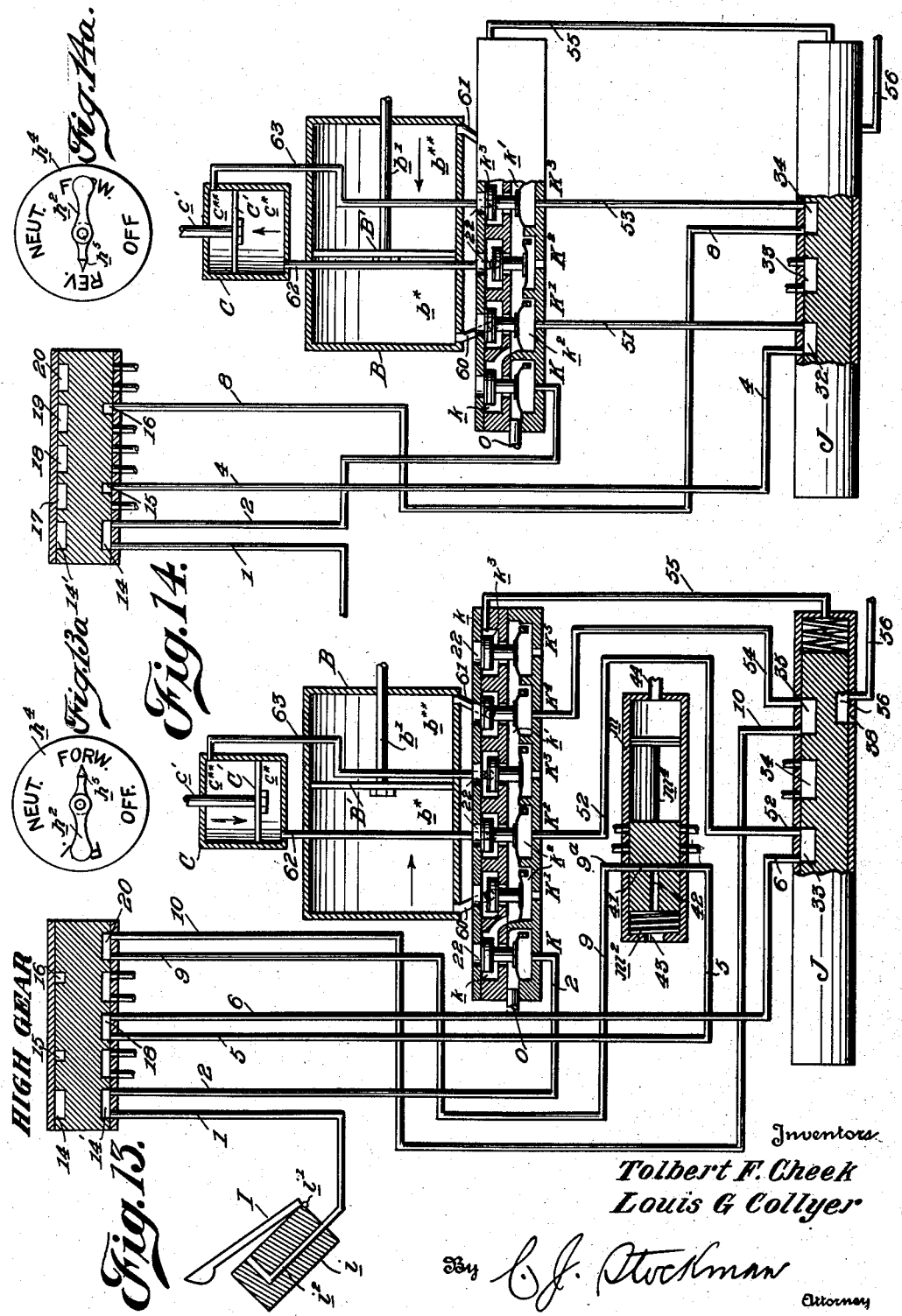

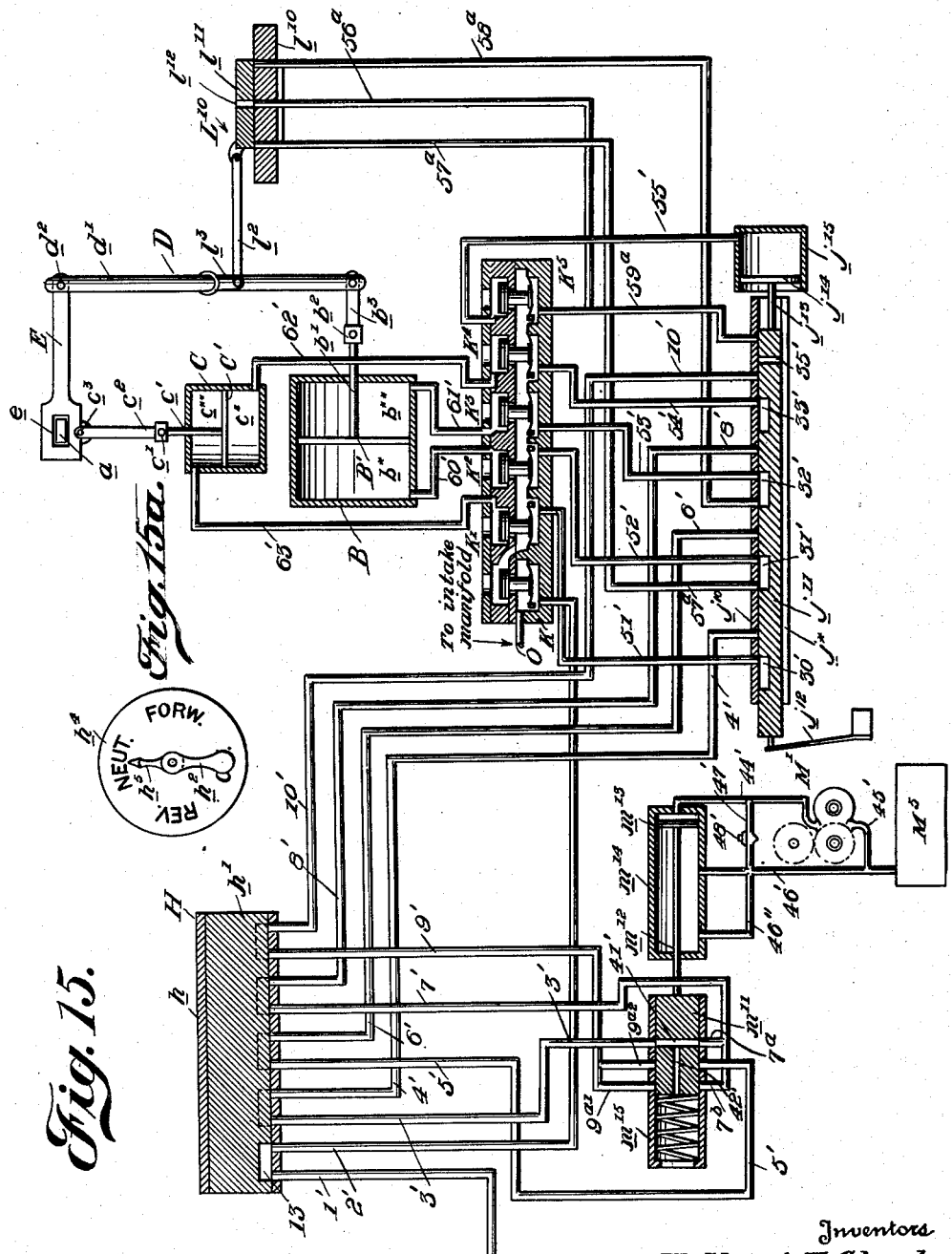

Feb. 13, 1940.  T. F. CHEEK ET AL  2,190,256

AUTOMATIC GEAR SHIFTING MECHANISM

Filed April 9, 1935   9 Sheets-Sheet 8

Inventors
Tolbert F. Cheek
Louis G. Collyer
By C. J. Stockman
Attorney

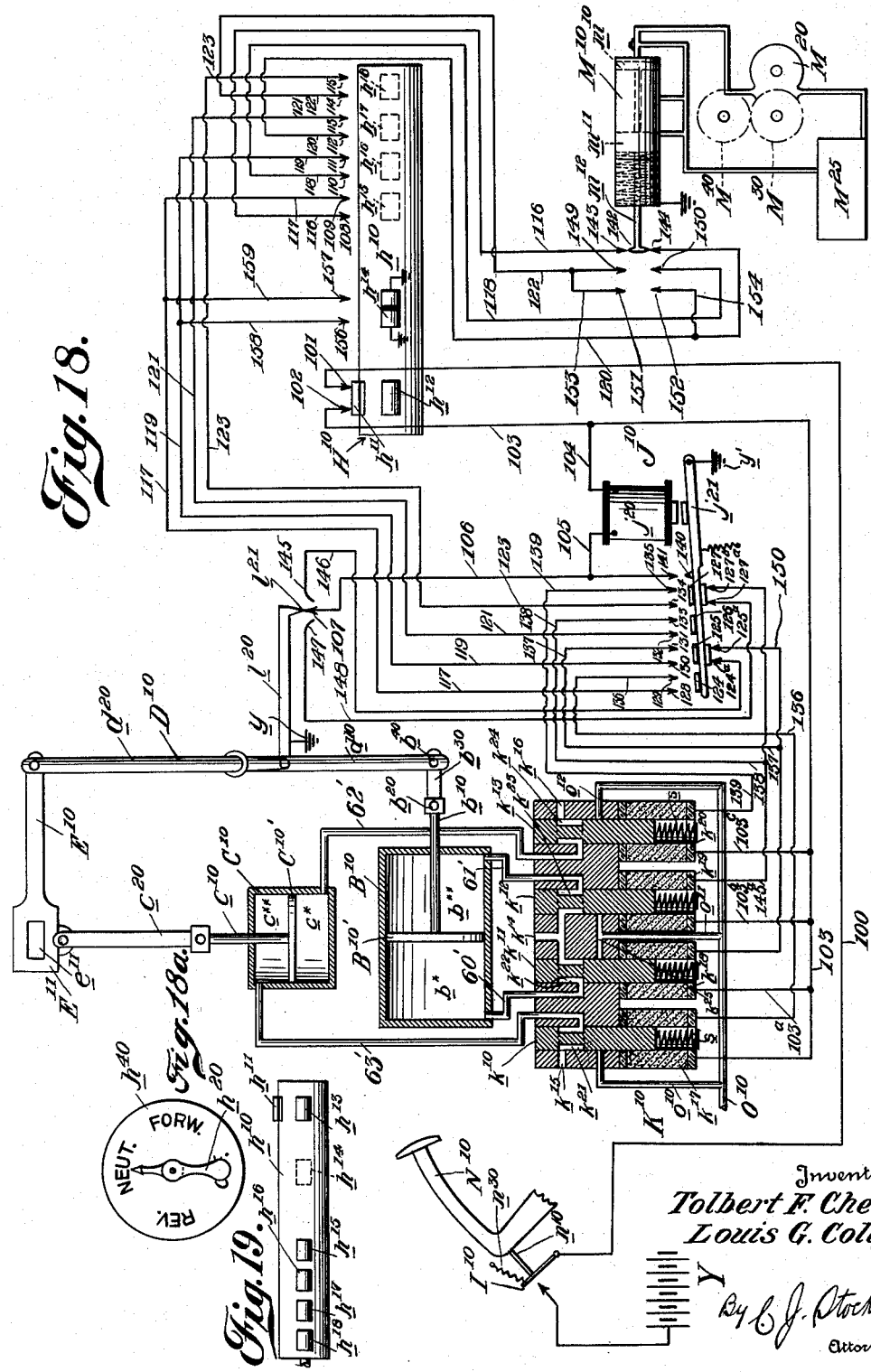

Patented Feb. 13, 1940

2,190,256

UNITED STATES PATENT OFFICE 2,190,256

AUTOMATIC GEAR SHIFTING MECHANISM

Tolbert F. Cheek, New York, and Louis G. Collyer, Congers, N. Y., assignors to Welte-Mignon Piano Corporation, Inc., Brooklyn, N. Y., a corporation of New York Application April 9, 1935, Serial No. 15,474

23 Claims. (Cl. 74—334)

One of the important purposes of the invention is to eliminate the manually operated gear shifting lever commonly used in the shifting of the gears of motor vehicles of the gasoline engine type and to substitute for said lever a means which will automatically shift the gears from a neutral position thereof to "low" and from "low" to "second" and from "second" to "high" when the clutch has been released for each of these shifts and which will operate in shifting from "low" to "second" and from "second" to "high" at those times, predetermined by the speed of the vehicle, at which the gears to be intermeshed in the said shifting operations are rotating at substantially the same speed and thus may be intermeshed without clashing.

Another important purpose of the invention is to provide a gear shifting mechanism which comprises pneumatically operable power applying means for connection with the gears to be shifted and a plurality of coacting control members operably associated with said power applying means to variably regulate the relative pressures to which the latter is subjected in effecting the several gear shifting operations and whereof one of said members is settable by the operator of the vehicle into a position for forward movement of the vehicle for all speeds of the latter and another of which is automatically operated under control of the speed of the vehicle for the shifting operations from "low" into "second" and from "second" into "high".

Still another important purpose of the invention is to provide a gear shifting mechanism which comprises a pneumatically operable power applying means and means for controlling the pneumatic pressures to which said power applying means is subjected in effecting the various shifting operations, including a control member which is settable into a position in which it predetermines whether the power applying means shall be operated to effect forward or reverse movement of the vehicle, as the case may be, and which when once set for forward movement of the vehicle, coacts with other control means in causing the gears to be automatically shifted from "low" to "second" and from "second" to "high" without calling for any further attention upon the part of the operator of the vehicle, except the releasing of the clutch when the mechanism forming the subject of this application for patent is applied to transmissions of the type in which the clutch is not automatically released.

A further important purpose of the invention is to provide a gear shifting mechanism comprising a pneumatically operated power applying means for connection with the gears to be shifted, a series of valvular units having connection with said power applying means and a plurality of interdependently operated control means which coact in causing the said valvular units to be operated selectively to thereby variably control the relative pressures to which said power applying means is subjected in effecting the several shifting operations.

These important purposes and others which will appear to those familiar with automatic gear shifting mechanisms, including the one to which this application relates, are accomplished in each of the several embodiments shown in the accompanying drawings and hereinafter described in detail. Each of these several embodiments is characterized in that it includes a master control means, a manipulative means having connection with the master control means and including a member settable to a position which predetermines whether the shifting operation shall be that resulting in forward or that resulting in rearward movement of the vehicle, a pneumatically operable means having operating connections with an appropriate gear shifting member of the transmission mechanism, for applying thereto the power which shifts the gears, a plurality of valvular control units having connection with the power applying means and interdependently-operated means which are so associated with each other and with said manipulative means as to cause said valvular units to be automatically operated selectively in accord with the shifts to be made and at proper times in relation to the speeds of the vehicle.

The "manipulative means" hereinbefore referred to by which the direction of movement of the vehicle is predetermined, preferably comprises a rotative body member which is settable into different positions and is provided with means to control various connections through which other parts of the mechanism in turn are controlled, including connections appropriate for forward or reverse movement of the vehicle, as the case may be, and for the shifting from one gear ratio to another automatically in the forward movement of the vehicle, without further setting of said member. This member is moved into its different set positions by an appropriate operating device which is within easy reach of the operator of the vehicle, as upon the dashboard, for example. The said operating device may conveniently be in the form of a manually operative lever and an appropriate dial, or the like, having suitable indicia (as Neut., Forw., Rev. and Off, for example) should be employed to designate the respective positions to which said body member should be set when the gears are to be in neutral position and when the connections are to be prepared for reverse or forward movement of the vehicle, as the case may be, or are to be entirely closed throughout. This means is hereinafter referred to as a "preparatory means" but said term applied thereto is not intended to be regarded as being restricted to the precise structure thereof hereinafter described in detail.

The pneumatically operable power applying means hereinbefore referred to comprises suitable operating members for connection with an appropriate gear shifting member of the transmission mechanism together with an operating means which is responsive to variations in the relative pressures on opposite sides thereof and acts to impart to said operating members the movements necessary in accomplishing the gear shifting operations. This operating means may be in the form of a piston reciprocatorily mounted in an appropriate chamber having air ducts connected to its ends on opposite sides of the piston, or may be in the form of a flexible diaphragm mounted in an appropriate chamber provided with such ducts. In operation, said gear shifting member of the transmission mechanism has movements in right-angular directions, one of said movements being to seat it in corresponding notches in longitudinally movable shift bars and the other to move said shift bars longitudinally, as is well known to those familiar with the at present standard gear shifting mechanisms. It is preferred, in practice, to employ pneumatic members, either pistons or diaphragms, for accomplishing both of these movements, respectively, and in such case, the pneumatic member which is to move the gear shifting member of the transmission mechanism into and out of its seats in the respective shift bars is called upon to apply light pressure only, as compared with that applied to the other member, which accomplishes the longitudinal movement.

The master control means hereinbefore referred to includes a member which is operated to initiate the shifting operations when the clutch has been released. In those mechanisms in which the clutch is released and re-engaged under control of a clutch pedal, said master control member and clutch pedal are relatively so arranged that the master control member will be operated under control of said pedal. However, the present system is applicable in principle to mechanisms in which the release of the clutch is automatically effected and, additionally, if so desired, the operation of accelerating the speed of the vehicle incidental to shifting operations likewise is automatically effected, thereby making all phases of the operations incidental to the shifting of the gears fully automatic when the preparatory means has been adjusted for forward or reverse movement of the vehicle and the engine has been started into operation.

The means which control the relative pressures to which said pneumatically operable members of the power applying means are subjected in effecting the various shifting operations includes a series of valvular units respectively having connections with the chambers containing said pneumatically operable members and which connections are controlled by selective operation of said valvular units. These valvular units are controlled, in part, by the preparatory means hereinbefore referred to and, in part, by other control members which coact with each other and with said preparatory means to cause the shifting of the gears to be so timed in relation to the vehicle speed that the shifts may take place only when the gears will not clash in going into mesh. One of the latter control members is automatically adjustable by suitable means under control of the speed of the vehicle. A pump, either hydraulic or pneumatic, as preferred, having connection with the speedometer shaft provides a very desirable means for the operation of said control member. This control member is constructed to variably control the connections through which the before mentioned valvular units are selectively operated and said connections include two additional control members, one of which is controlled by a member of the power applying means and has a controlling influence upon the other, and the latter has connection with certain of the before mentioned valvular units, respectively. An additional valvular unit included in the system has connection with the preparatory means.

Reference has hereinbefore been made to pneumatic pressures to which the pneumatically operable members of the power applying means are subjected in effecting the various shifting operations. These pressures are preferably atmospheric and less than atmospheric, respectively. In other words, in effecting operation of the said pneumatically operable members it is preferred to reduce the pressure of the air at one side of the same to below that of the atmosphere, whereupon air at atmospheric pressure will be effective to move said member. It will be understood that in certain of the operations the reduction of the air occurs at one side of said member and at other times at the opposite side of said member. It should be understood, however, that it may not be wholly impracticable to employ airs of other relatively different pressures than atmospheric and less than atmospheric, respectively, such as, for example, airs of atmospheric and above atmospheric pressures or airs of different minus pressures. However, the use of air having relatively different pressures at and above that of the atmosphere or relatively different pressures below atmospheric, involves complications in comparison with systems designed for air at atmospheric and less than atmospheric pressures, since the latter may conveniently utilize the intake manifold of the engine of the motor vehicle in creating suction in the parts of the system in which air of less than atmospheric air is employed and simplifies the valvular arrangement for the inflow of air at atmospheric pressure. Accordingly, we have illustrated and will hereinafter describe in detail the system as designed to utilize the pressure of the outside air and suction induced by the engine without intending thereby to restrict the invention, considered in its broad aspects and as defined in appended claims, to the utilization of air having these particular relative pressures.

The entire system may be of pneumatic nature or said system may be of electro-pneumatic nature, as preferred. When the entire system is of pneumatic nature, all of the connections provide channels for the passage of air therethrough and the several control members are of corresponding nature and operate in controlling said channels. If the system is of electro-pneumatic nature the before mentioned power applying means will still be of pneumatic nature and the valvular units will be of a nature appropriate to control the pneumatic pressures to which the pneumatically operated members of said power applying means are subjected, but the means for selectively operating the valvular members of said units may be and as hereinafter set forth are of electrical nature, including the master control member, the preparatory means and the coacting interdependently operated control means, together with the several connections to the valve operating members of said units.

In the accompanying drawings certain preferred embodiments of the invention have been illustrated and these embodiments will be minutely described without, however, intending thereby to restrict the invention to the details thereof since we are well aware that the invention may be otherwise and variously embodied without departing from the scope of the protection defined by appended claims.

In said drawings:

Fig. 4 is a top plan view of the said casing, with the cap thereof removed, and shows the application of the several parts of our mechanism to said casing and to the shift bars of the transmission mechanism;

Figs. 8 and 9 are sectional views, on a larger scale than the preceding figures, showing certain pneumatically controlled valve units for controlling the pneumatic pressures to which the power applying members are subjected in effecting the shifting of the gears, these two figures showing the valve members of the units in different relative positions;

Fig. 10 is a diagrammatic view, mainly in section, showing the entire system of pneumatically controlled valves and adjunctive devices in the neutral position of the gears and shows the position of the operating device of the preparatory means, at this time, but omits the clutch-release pedal and also the transmission mechanism;

Fig. 11 is a sectional representation, diagrammatic in its nature, and shows the position of the operating device of the preparatory means and of the pneumatically operated valve units and adjunctive means severally occupied by them in shifting from "neutral" to "low";

Fig. 12 is a view similar to Fig. 11, but shows the positions of the parts when the shift is from "low" to "second";

Fig. 13 is a similar view showing the positions of the parts when the shift is from "second" to "high";

Fig. 14 is a similar view showing the positions of the parts when the shift is from "neutral" to "reverse";

Fig. 15 illustrates, mainly in section, a modified embodiment of the invention and shows the neutral position of the several valves, as indicated by the dial and operating device of the preparatory means;

Fig. 18 is a diagrammatic representation illustrating a preferred embodiment of electro-pneumatic nature, showing the parts in neutral position, as indicated by the operating device and dial of the preparatory means; and Fig. 19 is a view of the rotative member of said preparatory means as seen from the side opposite that presented in Fig. 18.

Figs. 10$^a$, 11$^a$, 12$^a$, 13$^a$, 14$^a$, 15$^a$ and 18$^a$ illustrate the setting of the indicator and its connected parts for the settings and positions of the parts in Figs. 10, 11, 12, 13, 14, 15, and 18, respectively.

A designates the gear housing of the transmission mechanism of an automotive vehicle, within which the transmission gears (not shown) are encased, and A$^1$ designates the cover of said housing.

As is well known, the present standard gear shifting construction includes a slidable rectangular member $a$, Fig. 4, mounted to be movable laterally within a slot $a^1$ for selective engagement with rectangular notches $a^2$ and $a^3$ in shift bars $a^4$ and $a^5$, each of which bars is movable rearwardly and forwardly for moving the gears into "low", "second", "high", and "reverse", as desired. Said member $a$ at present is operated by a manually operated gear shifting lever which protrudes into the forward compartment of the vehicle but, by the present invention, this lever, as previously herein stated, is eliminated and the gear shifting member $a$ of the transmission mechanism is automatically operated by our gear shifting mechanism.

The means employed illustrated in Figs. 1–4, 10–15 and 18 for applying power to the member $a$, in effecting the gear shifting operations, includes a pair of chambers B and C, a pneumatically operated piston B' in the casing B, a pneumatically operated piston C' in the casing C, appropriate connections between said pistons and the member $a$, for moving the latter in right angular directions, and suitable means for controlling relative pneumatic pressures to which said pistons are subjected in effecting the gear shifting operations.

The casing B is preferably secured to one side of the housing A by suitable brackets $b$ and the casing C is preferably secured to said housing by suitable brackets $c$. As shown in Fig. 4, the stem $b^1$ of the piston B' projects through one end of the casing B and is pivotally connected at $b^2$ to a link $b^3$ which in turn is pivotally connected at $b^4$ to one end of one member $d$ of a Z-shaped lever D, another of whose members, $d^1$ is pivoted at $d^2$ to one end of a bar E. This bar E is movably disposed within a suitable guideway in the cover A', not shown in Fig. 4, of the gear housing A and has its end (designated E') opposite its pivot enlarged and provided with a rectangular opening $e$ for the reception of the member $a$.

Figure 17:
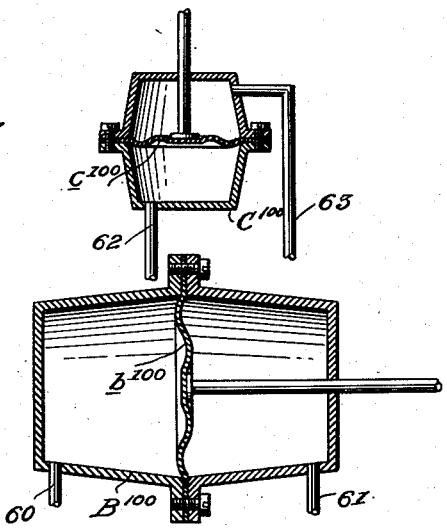
Fig. 17 is a detail representation showing pneumatically operable power applying members which may be employed instead of those illustrated in preceding figures.

In lieu of the pistons B' and C' and the particular chambers B and C in which said pistons are respectively mounted, pneumatically operated diaphragms mounted in appropriate chambers, may be employed, as shown in Fig. 17, in which the chambers are designated $B^{100}$ and $C^{100}$ respectively and the diaphragms are designated $b^{100}$ and $c^{100}$.

The member $a$ is selectively movable into the recesses $a^2$ and $a^3$ in the shift bars $a^4$ and $a^5$, respectively, by the pistons C' or diaphragm $c^{100}$ and the meshing of the gears for the different speeds is effected by longitudinal movement of said bars transmitted thereto from the piston B' or diaphragm $b^{100}$ through the connections just described to the member $a$, the use of either pistons or diaphragms as the pneumatically operable members of the power applying means calling for no change with respect to the connections. The lever D has its intermediate member $d^3$ journalled in bearings $d^4$.

In order that the piston C' or diaphragm $c^{100}$ may be operative to shift the member $a$ selectively into the recesses $a^2$ and $a^3$ in the shift bars $a^4$ and $a^5$, respectively, said piston and likewise the diaphragm when the latter is employed in lieu of the piston, is provided with a stem, $c^1$, which projects through an end wall of the chamber C or $C^{100}$. This stem, as shown in Fig. 4, has its outer end pivoted at $c^1$ to one end of a link $c^2$ whose opposite end is pivoted, at $c^3$, to the corresponding side of the enlarged end E' of the bar E. This movement of the member $a$ is in a direction at right angles to the direction of the movement of said bar derived from the piston B' or diaphragm $b^{100}$.

In the particular embodiments shown in Figs. 1-15, inclusive, but to the details of which embodiments this invention is not restricted, the "preparatory means", which is adjustable to predetermine whether the shifting operation shall be from neutral into low or from low into reverse, is designated as a whole by the letter H; the "master control" means, which has been referred to as being operative to initiate the shifting operations when the clutch has been released, comprises a valve I; the series of valvular units which are connected to the chamber on opposite sides of the pneumatically operated members of the power applying means are respectively designated $K^1$, $K^2$, $K^3$ and $K^4$. The interdependently-operated control means which coact with each other and with said preparatory means in controlling selective operation of said valvular units $K^1$-$K^4$ comprise a valvular means, designated as a whole by the letter J, a valvular unit $K^5$ having connection with the valvular means J, a valvular means L which has a controlling influence with respect to the valvular means J through the valvular unit K and a valvular means, designated as a whole by the letter M, which is operated under control of the speed of the vehicle and has connection with the preparatory means and with the valvular means J and assures that the selective operations of the valvular units $K^1$-$K^4$ in effecting the shifting of the gears from low into second and from second into high shall occur only at those times in relation to the speeds of the vehicle at which the gears may be intermeshed without clashing. This mechanism also includes a valvular unit K which has separate connections with the preparatory means and with a suction-inducing part of the engine of the vehicle. This particular valvular unit has a controlling influence with respect to all of the valvular units $K^1$-$K^5$, as will be hereinafter explained. The structure of these several means incorporated in the system as arranged for pneumatic operation throughout, shown in Figs. 1-17, inclusive, will presently be described in detail and it may be here mentioned that the system, shown in Figs. 18 and 19, has means corresponding to those hereinbefore referred to although certain of said means have been designed to be operated electromagnetically, instead of pneumatically.

The "preparatory means" H employed in the pneumatic system illustrated in Figs. 1-15, inclusive, includes a valve body $h^1$ which is rotatively mounted in a casing $h$ having a series of ports to which a series of ducts, respectively marked 1-10, inclusive, are connected. These ports are arranged in a line along the length of the casing and the latter has two additional ports designated 11 and 12. The rotative valve body $h^1$, as shown best in Fig. 7, has its circumference formed to provide a series of spaced ports respectively marked 13-20, inclusive, certain of which are respectively arranged to place the adjacent ends of corresponding pairs of the ducts adjacent said valve body into communication with each other for the shifting of the gears into low, into second and into high, and others of which (namely those designated 15 and 16) are operatively related to the ducts 4 and 8, only, for the shifting of the gears into reverse, at which time they have direct communication with the atmosphere through ports 11 and 12, respectively. This valve body $h^1$ has an additional recess 14' which is not shown in Fig. 7, since it is arranged in the circumference of the valve body at a point diametrically opposite the recess 14 but is shown in Figs. 11, 12 and 13.

Rotative adjustment of said valve body $h^1$ relatively to the casing $h$ is effected by the operation of the lever $h^2$ which is attached to the journal $h^3$. This lever is arranged to be manually operated and is correlated with a dial, $h^4$, having suitable designations as Rev., Neut., Forw. and Off to show the positions to which the valve body should be adjusted in preparing the connections for reverse or forward movement of the vehicle and also to show the position to which said valve body should be moved for adjustment of the gears into a neutral position and also for the complete closing of all of the connections. One end of the lever $h^2$ is provided with a pointer $h^5$ which cooperates with said designations in showing the position of the valve body within the cylinder. This "preparatory means" H is mounted in any convenient position within the vehicle, as upon the dashboard X, for example. It should be understood that the invention is not confined to a "preparatory means" having the rotative valve member $h^1$ even when of pneumatic nature and further is not confined to the use of a manually operated operating lever, as the lever $h^2$, but the described valve member and lever are simple in structure and operate satisfactorily and for those reasons are greatly preferred.

The "master control" valve I is pivoted at one end ($i^1$) to a block $i$ having a channel $i^2$, and is normally held in closed position by a spring $i^3$. As here embodied it is moved to its open position, against the tension of said spring, by the clutch-release pedal N in the clutch-releasing movement of the latter, said pedal having an arm $n$ provided with a projection $n^1$ whose path of movement is such that it engages the free end of the valve I and presses the same rearward. This clutch-release pedal, as here shown, comprises an arm $n^2$ additional to its arm $n$ and is pivoted at the junction $n^3$ of said arms. It is connected, in practice, with the clutch by usual means (not shown) and the free end of its arm $n^2$ is provided with a foot piece $n^4$ for convenience in operating it, as usual.

As previously stated, the pneumatic system includes a valvular means J, a series of valvular units designated K-K$^5$, respectively, a valvular means L, a valvular means designated as a whole by the letter M, means under control of the speed of the vehicle for operating the valve of the last mentioned member and a series of air ducts, including the ducts 1-10, previously referred to, the passage of air through which is selectively controlled by the cooperative action of the valves of the several means herein referred to. The preferred construction of these means will now be severally described, as follows:

The valvular means J comprises a casing $j$ within which is slidably mounted a valve body $j^1$ having a series of longitudinally aligned recesses which form ports, respectively marked 30, 31, 32, 33, 34 and 35, through which the ends of certain ducts are selectively connected with each other in pairs, as hereinafter explained. It also has a separate recess forming a port 36 arranged opposite the port 35. The casing also contains a spring $j^2$ which is arranged to exert mechanical pressure against one end of said valve body. The end of the casing opposite the spring is provided with an atmospheric port or opening 37 and said casing is also provided near its opposite end with an atmospheric port 38 which is always in communication with the recess or port 36 in the valve body.

Each of the aforesaid series of valvular units K-K$^5$ comprises three chambers respectively marked $k$, $k^1$ and $k^2$ and is provided with ports 22, 23, and 24 and a bleed hole 25. The chamber $k$ of the valve unit K is preferably connected, through port 27 and duct O, with the intake manifold of the engine, as indicated.

As a matter of practical expediency, for the sake of compactness and simplicity of construction, these several valvular units are preferably mounted in a casing common thereto as shown in Fig. 10 and, in such case, the chamber $k$ of the unit K is connected, through a port 26, with a chamber $k^1$ which is common to the several units K$^1$-K$^5$, inclusive. Each unit also comprises a valve member $k^3$ having a stem $k^4$ which extends through the port 23 of said unit and has its lower end engaged with a flexible diaphragm $k'$ which separates the chambers $k^1$ and $k^2$ of the corresponding unit from each other. The valve members $k^3$ of the respective units are mounted in the chambers $k$ and open the corresponding ports 22 and 23 alternately. Each port 22 is an atmospheric port and is normally open. The port 23 of each unit is a suction port. It extends through the wall dividing the chambers $k$ and $k^1$ from each other and hence said chambers have communicated with each other when the valve member $k^3$ is in the position, shown in Fig. 9 in which it closes the atmospheric port 22 and opens the suction port 23 of the unit. Each port 24 leads to the chamber $k^2$ of the corresponding unit and each bleed hole 25 connects the chambers $k^1$ and $k_2$ of the corresponding unit permanently with each other.

The valvular means L comprises a casing $l$ and a slidable valve body $l^1$ which is supported and guided in said casing and is connected to the vertical or bearing portion of the lever D by a rod $l^2$ and a crank arm $l^3$. The casing $l$ is shown as being open to the atmosphere at both ends of the valve body $l^1$ and is provided with an atmospheric port 39 which is opened and closed by said valve body, the latter having a channel 40 for registration with said port 39.

The valvular means M comprises a casing $m$ having two series of oppositely arranged ports. It also comprises a valve body $m^1$ having a port 41 which extends through its opposite sides and is adapted, by movement of the valve body to communicate selectively with corresponding parts of the two series. This port 41 is arranged about midway the length of the valve body and said valve body is provided with a separate port, 42, which extends through one of its ends to the port 41 and opens into the latter. One end of the valve casing $m$ is provided with a port 43 through which the port 42, and hence the port 41 also, have communication with the atmosphere in all the operative positions of the valve body $m^1$. Mounted in the end of the casing adjacent that provided with the port 43 is a spring $m^2$ and mounted in the opposite end of the casing is a plunger or piston $m^3$ which is connected to the corresponding end of said valve body by a stem $m^4$.

In one embodiment of the invention, the end of the casing in which the piston or plunger $m^3$ operates is connected with the exhaust side of a hydraulic pump M$^1$ by a tube 44. This pump is driven in consonance with the speed of the vehicle through the medium of intermeshing gears M$^2$ and M$^3$, the former of which is mounted on an appropriate rotative part, as the speedometer shaft M$^4$, for example, and the other of which is carried by the pump.

In this particular embodiment, M$^5$ designates a liquid container or chamber having communication with the intake side of the pump casing through a tube 45 and with the valve casing $m$ through a pipe 46 which enters said casing at one end of the valve body $m^1$. A branch connection between the pipes 44 and 46 is provided by a pipe 47. 48 designates an adjustable needle valve and 49 the seat for the pointed end of said needle valve. These are arranged at the junction of the pipes 44 and 47 and control, by adjustment of the needle valve, the amount of liquid passing into the casing $m$, thereby regulating the pressure exerted upon the piston or plunger $m^3$ to cause movement of the valve body $m^1$ in accord with the speeds of the vehicle predetermined for such movement. The pipe 46 which directly connects the valve casing $m$ with the container M$^5$ acts as a drain through which any liquid which may escape past the piston or plunger $m^3$ is returned to said container, and a branch connection 50 is provided through which liquid is returned to the pipe 47 and thence through pipe 46 to the container M$^5$ upon movement of piston $m^3$ to a position beyond the branch connection 50. The liquid preferably utilized in this part of the shifting mechanism is oil, the reason for which is apparent.

Referring now particularly to Fig. 10, which shows the positions of the valves with respect to the connections when the gears are in neutral position, it will be noticed:

That the duct 1 extends from the corresponding port in the valve casing $h$ of the "preparatory means" H to the channel $i^2$ of the block $i$; that the duct 2 extends from the corresponding port in said valve casing to the chamber $k^2$ of the valve unit K; that the duct 3 extends from the corresponding port in said casing $h$ to the valve casing $m$ and enters one side of the latter; that the duct 5 extends from the corresponding port in the valve casing $h$ to the valve casing $m$ and enters the latter at the same side as, but in a spaced relation with respect to, the duct 3 and has a branch $5^a$ which enters said valve casing $m$ at a point diametrically opposite the entrance of duct 3 into said casing; that the duct 7 extends, from the corresponding port in said casing $h$, directly to the casing $m$ and enters the latter at a point adjacent the duct 3 and on the side of said duct opposite the duct 5; that the duct 9 has two branches $9^a$ and $9^b$ which enter the casing $m$ at points respective diametrically opposite the duct 5 and the end of the duct 7.

It will also be noted that the ducts 4, 6, 8 and 10 extend from the casing of the preparatory means H to the casing $j$ of the control means J and enters the latter at different places along the length of the same and into operative relationship with different ports in the valve body $j^1$, respectively. Thus, it will be seen that the duct 4 extends into operative relationship with the port 32, the duct 6 extends into operative relationship with the port 33, the duct 8 extends into operative relationship with the port 34 and the duct 10 extends into operative relationship with the port 35.

It will further be noticed that the corresponding chambers $k^2$ of the control units $K^1$, $K^2$, $K^3$ and $K^4$ are connected with the interior of the casing $j$ of the valved means J by ducts respectively designated 51, 52, 53 and 54. The duct 51 enters said casing $j$ at a place which is so positioned with respect to the corresponding end of the duct 4 and the port 32 in the valve body $j^1$ that both corresponding ends of said ducts 51 and 4 communicate with each other through said port 32 when the valve body $j^1$ is in one of its positions. This duct 51 is tapped by one end of a branch $51^a$ whose opposite end enters the casing $j$ at a place which is operatively related to the port 31 in the valve body $j^1$. The duct 54 enters the casing $j$ at a place adjacent one end of the valve body $j^1$ and is tapped by a branch $54^a$ which enters said casing $j$ at a place adjacent the other end of said valve body and is operatively related to the port 30 in the valve body. The chamber $k$ of the valve unit $K^5$ is connected with the corresponding end of the casing $j$ by a duct 55.

The casing $j$ is also connected with the casing $l$ forming part of the valved means L by a duct 56 one end of which enters the casing $j$ near one end of the latter and extends thence into a position in which, as shown, it registers with the port 39 in the casing $l$. This duct 56 is connected by a branch duct 56' with the chamber $k^2$ of the valve unit $K^5$. Two additional ducts, 57 and 58, are also connected to the casing $l$ and connect the latter with the valved means J—the duct 57 being arranged on one side of the duct 56 and entering the casing $j$ in a position operatively related to the port 31 and the duct 58 entering the casing $l$ on the side of the duct 56 opposite the duct 57 and entering the casing $j$ at a place which is operatively related to the port 30 in the valve body $j^1$.

The chambers $k$ of the respective valve units $K^1$ and $K^4$ are connected with the opposite ends $b^*$ and $b^{**}$ of the piston casing or cylinder B, that is, on opposite sides of the piston $B^1$, by ducts 60 and 61, respectively, and the chambers $k$ of the units $K^2$ and $K^3$ are connected with the opposite ends $c^*$ and $c^{**}$ of the piston casing or cylinder C on opposite sides of the piston C' by ducts 62 and 63, respectively.

*Correlation of the parts in neutral position*

It will be noticed that when the lever $h^2$ of the "preparatory means" H is in the neutral position shown in Fig. 10 and the valve I is closed: the valve members $k^3$ of the several valve units K-$K^5$ will be in a position in which the several chambers $k$ of said units are in communication with the atmosphere through the ports 22 and the chamber $k^2$ of the valve unit $K^5$ is in communication with the atmosphere through the branch duct 56', duct 56, port 39 and port 40; the end portions $b^*$ and $b^{**}$ and $c^*$ and $c^{**}$ of the casings or cylinders B and C on opposite sides of the pistons B' and C' in said cylinders are in communication with the atmosphere through the ducts 60, 61, 62 and 63 and the chambers $k$ and ports 22 of the valve units $K^1$, $K^2$, $K^3$ and $K^4$; and the chamber $k^1$ common to the several ducts $K^1$—$K^5$ is in communication with the atmosphere through the port 26, chamber $k$ and port 22 of the valve unit K. At this time also the valve body $m^1$ of the control means M is in the position in which its port 41 is in registration with the duct 7 and the branch $9^b$ of the duct 9, and the valve member $j^1$ of the control unit J is in the position in which its port 30 is in communication with the ends of the duct 58 and branch duct $54^a$, its port 31 is in communication with the ends of duct 57 and branch duct $51^a$, its port 32 is in communication with the duct 4, its port 34 is in communication with the duct 6, its duct 34 is in communication with the duct 8, its port 35 is in communication with the duct 10 and its port 36 is in communication with the atmosphere through port 38.

*Operation*

As a preliminary step in the shifting of the gears into low the lever $h^2$ of the preparatory means H is moved to the position in which its hand $h^5$ points to Forw., thereby moving the valve body $h^1$ to the position in which its port 14' (Fig. 11) registers with ducts 1 and 2, its port 19 registers with ducts 7 and 8 and its port 20 registers with ducts 9 and 10. At this time also the port 17 registers with ducts 3 and 4 and the port 18 registers with ducts 5 and 6 in order that the ways may be prepared for subsequent shifting operations from low to second and from second to high, the shifting operations into low calling only for the ducts 7–10, inclusive. In short, adjustment of the valve body $h^1$ to the position corresponding to Forw. on the dial is the only adjustment thereof necessary in effecting all the shifting operations for forward movement of the vehicle.

When the engine is started, the pressure of the air in chamber $k^1$ of the valve unit K is immediately reduced by the suction created in duct O and, since the chamber $k^2$ of said unit K has communication with said chamber $k^1$ through the bleed hole 25, the pressure of the air in said chamber $k^2$ and also in the ducts 1 and 2 is similarly reduced. If the engine is started before the lever $h^2$ has been adjusted for forward movement of the vehicle, communication between ducts 1 and 2 is established through the port 13 and is interrupted in the adjustment of the said lever to the said position, but this interruption is momentary only since communication is immediately re-established through the port 14', shown in Fig. 11.

Upon the opening of the "master control" valve I there will be an inrush of air at atmospheric pressure through the channel $i^2$, duct 1, recess 14' and duct 2 into the chamber $k^2$ of the valve unit K and since the chamber $k^1$ of said valve unit is, as already stated, under suction at this time, the corresponding valve body $k^3$ will be instantaneously moved to the position in which it closes the corresponding atmospheric port 22 and opens the corresponding suction port 23, thereby placing the chambers $k$ and $k^1$ of said valve unit (K) in communication with each other. As a result of this movement of the valve body $k^3$ of the unit K, the chamber $k^1$ common to the several valve units $K^1$–$K^5$ is placed under suction. Inasmuch as the chamber $k^2$ of the valve unit $K^5$ is in communication with the atmosphere at this time, (through the branch duct 56', duct 56, port 39 in casing $l$ and port 40 in valve body $l^1$) it follows that the valve body $k^3$ of said unit $K^5$ will be moved to the position in which the corresponding chamber $k$ is closed against the atmosphere and opened to suction. Since chamber $k$ of valve unit $K^5$ is in communication, through duct 55, with one end of the casing $j$ of the valved means J, the pressure of the air in said end will now be reduced sufficiently to enable the atmospheric pressure, admitted through port 37 and acting upon the end of the valve body $j'$ opposite the duct 55, to be effective to move said valve body longitudinally to the position shown in Fig. 11, in which its port 34 registers with the ducts 8 and 53 and its port 35 registers with the ducts 10 and 54. Said port 34 is in communication with the atmosphere, through the port 43 in the casing $m$, ports 42 and 41 in the valve body $m^1$, duct 7, port 19 in the valve body $h^1$ of the preparatory means H and duct 8; and port 35 is in communication with the atmosphere through said port 43 in the casing $m$, ports 42 and 41 in the valve body $m^1$, branch duct $9^b$, duct 9, port 20 in the valve member $h^1$ of the preparatory means H and duct 10. Since at this time the port 34 has opened communication between ducts 8 and 53 and port 35 has opened communication between ducts 10 and 54, it follows that the chambers $k^2$ of the respective valve units $K^3$ and $K^4$ are opened to the atmosphere, whereupon the respective valve members $k^3$ of said valve units will close the corresponding atmospheric ports 22 and open the corresponding suction ports 23, thereby placing the end portions $c^{}$ and $b^{}$ of the respective piston casings or cylinders B and C under suction. At this time, the end portion $c^*$ of the casing or cylinder C is in communication with the atmosphere through the atmospheric port 22 and chamber $k$ of valve unit $K^2$, and the duct 62, and the end portion $b^*$ of the casing or cylinder B is in communication with the atmosphere through atmospheric port 22 and chamber $k$ of valve unit $K^1$ and the duct 60; hence, preponderating pressure in said end portions $c^*$ and $b^*$ causes movement of the pistons C' and B' in the directions of the arrows (Fig. 11) and operates the member $a$ (Fig. 4) in the right angular directions required in bringing about the intermeshing of the low gears (not shown) of standard transmission mechanisms. In this operation, the piston C' exerts pressure upon the side of the enlarged end E' of the bar E through its stem $c$ and link $c^2$, thereby imparting lateral movement to said end and causing the member $a$ to be seated in the recess $a^3$ of the shift bar $a^5$, and the piston B' moves its stem $b^1$ outward, thereby imparting corresponding movement to the member $d$ of the Z-shaped lever D, which lever turns about its axis at $d^3$ and moves the bar E longitudinally within its guideway in a direction substantially the reverse of that of the piston B', and hence moves said shift bar $a^5$ in the direction which engages the "low" gears with each other.

It will be noticed that upon movement of piston B' the valve body $l^1$ is correspondingly moved, through lever D, arm $l^3$ and rod $l^2$, the movement of said valve body $l^1$, however, being of less extent than that of the piston B', since the connections are so proportioned that the movement of valve body $l^1$ is such that only one duct 56, 57 or 58 is open to atmosphere at any one time.

It will also be noticed that this valve body $l^1$ is in central position and the chamber $k^2$ of the valve unit K is open to atmosphere through ducts 56' and 56 and ports 39 and 40 of the valved unit L, when the gears are in neutral position, as hereinbefore stated, and that while the gears are being moved to low speed position said valve body $l^1$ will be moved in the direction indicated by the arrow in Fig. 10, whereby duct 56 will immediately be closed to atmosphere through ports 40 and 39, but port 38 of this valved unit J will have been moved into registration with the corresponding end of the duct 56 by the previously described movement of valve body $j^1$ of said unit (J) and hence valve $k^3$ of valve unit $K^5$ will be retained in raised position until the shift is completed.

The valve member $l^1$, the lever D and the pistons B' and C' remain in the position to which they have been moved in shifting from "neutral" to "low" until the shifting of the gears from "low" to "second" has been started. All of the valve members $k^3$ of the units K, $K^3$, $K^4$ and $K^5$, and also the valve member $j^1$ of the control means J, however, are automatically returned to the neutral position shown in Fig. 10 as soon as the master control valve I is closed, since the closing of said master control valve closes communication of the chamber $k^2$ of valve unit K with the atmosphere, which results in a balancing of the pressures on opposite sides of the diaphragm $k^1$ in said unit (K), whereupon the corresponding valve member $k^3$ returns to its position in which it opens the corresponding atmospheric port 22 and closes the corresponding suction port 23, thus opening the chamber $k^1$ common to the several valve units $K^1$–$K^5$ to the atmosphere, through the port 26 and the chamber $k$ of valve unit K, and thereby balancing the pressures (atmospheric) on opposite sides of the diaphragm $k^1$ of valve unit $K^5$ and permitting the corresponding valve member $k^3$ to move to the position in which it opens the corresponding atmospheric port 22 and causes air at atmospheric pressure to enter the corresponding chamber $k$ and flow through the duct 55 to the corresponding end of the casing $j$ of the control means J, thereby bringing about a counterbalancing of the pressures on opposite ends of the valve member $j^1$ in said casing and making the spring $j^2$ effective to restore said valve member to its former position.

During the preceding operation of shifting the gears into "low" the vehicle of course is stationary and the pump $M^1$ is not operating but when movement of the vehicle has commenced with the low gears in intermeshing relationship with each other, said pump begins to operate and in its operation draws the liquid, preferably oil, from the chamber $M^5$ into the inlet side of the pump, through the pipe 45, and discharges said liquid from the outlet side of the pump, through the pipe 44, against the piston $m^3$, in amounts controlled by the needle valve 48.

Acceleration of the speed of the vehicle causes a corresponding increase of the speed of the pump, whose effect with relation to the piston $m^3$ is so regulated by the needle valve 48 that by the time the speed of the vehicle has attained that at which the shifting into "second" may be accomplished without clashing of the gears, sufficient pressure will have been created at the end of the pipe 44 between said needle valve and the casing $m$, and hence upon the corresponding side of the piston $m^3$, to move the valve member $m^1$ from the position in which the port 41 of said member is in registration with duct 7 and with branch duct $9^b$ of duct 9 to the position in which its said port 41 is in registration with the duct 3 and branch duct $5^a$ of duct 5.

If now, the master control valve I be again opened, air at atmospheric pressure will again rush into the chamber $k^2$ of valve unit K, thereby again operating the valve member $k^3$ of said unit to again place the chamber $k^1$ common to the several units $K^1$–$K^5$ under suction. It will be remembered that the valve member $l^1$ of the control means L was moved to the position in which its port 40 is out of registration with duct 56 by the previous movement of the piston B' in shifting the gears into "low" and said valve member is in the latter position at the beginning of the operation of shifting the gears into "second". Hence, the opening of the master control valve I which initiates the shift from "low" into "second" does not immediately change the position of the valve member $k^3$ of the unit $K^5$ from that in which it is shown in Fig. 10, namely, from the position in which it opens the corresponding atmospheric port 22 and closes the corresponding suction port 23.

Duct 57, however, has been opened to the atmosphere by the described movement of the valve member $l^1$ and hence air at atmospheric pressure will flow through said duct to the port 31 in the valve member $j^1$, the said valve member being still in the position shown in Fig. 10. From said port 31 the air flows through the branch duct $51^a$ and the duct 51 into the chamber $k^2$ of the valve unit $K^1$. At this time the chamber $k^1$ of the said valve unit is under suction and hence the corresponding valve member $k^3$ will be moved to close the corresponding atmospheric port 22 and open the corresponding end portion $b^*$ of the piston casing or cylinder B to suction through the corresponding chamber $k$ and duct 60. Since at this time the end portion $b^{**}$ of said casing or cylinder B is under atmospheric pressure, through the chamber $k$ of the valve unit $K^4$ and duct 61, it follows that the piston B' will be moved toward the suction side of the said casing or cylinder, thus imparting corresponding movement to the member $a$ of the shifting mechanism, through the bar E and the previously described connections between said bar and piston B'. This particular phase of the movement of the piston B' during which the duct 56 is closed and the piston C' is not operating results in the disengaging of the gears and also results in the moving of valve member $l^1$ to its first position, thereby again opening duct 56 to the atmosphere and closing duct 57 against the atmosphere. Hence, the valve member $k^3$ of the valve unit $K^5$ is now moved to close the corresponding atmospheric port 22 and open the corresponding suction port 23. The pressure of the air in the end of the casing $j$ of the control means J opposite the atmospheric port 37 in said casing consequently is reduced by suction from chamber $k$ of the valve unit $K^5$ through duct 55. As the result of this, the valve member $j^1$ of the control means J is again moved toward the thus exhausted side of the casing by the atmospheric pressure exerted on the opposite end of said valve member, into a position in which its port 32 is in communication with the chamber $k^2$ of the valve unit $K^1$ through the duct 51. Since this port 32 is open to the atmosphere through duct 4, port 17 and the valve member $h^1$ of the preparatory means, duct 3 and ports 41 and 42 of the valve member $m^1$, it follows that at substantially the same instant communication of chamber $k^2$ of valve unit $K^1$ with the atmosphere through duct 51, port 31 and duct 57 was broken, communication of said chamber $k^2$ with the atmosphere is again re-established, but this time is through the described connections between the port 32 and said chamber $k^2$ and the atmosphere, and the latter communication continues throughout the remaining phase of the operation of said piston B' in which the duct 56 is open to the atmosphere and both pistons are operating in completing the shift from "low" into "second".

The piston C' is operated at a proper time in relation to the movement of the piston B', as follows:

The movement of the valve member $j$ which placed its port 32 in communication with the chamber $k^2$ of valve unit $K^1$ through duct 51, also placed its port 33 in communication with the chamber $k^2$ of valve unit $K^2$, through duct 52, without closing communication of said port with duct 6. Hence, air at atmospheric pressure is admitted to the chamber $k^2$ of valve unit $K^2$— through ports 42, 41 in valve member $m^1$, branch duct $5^a$, duct 5, recess 18 in valve member $h^1$, duct 6, recess 33 in valve member $j^1$ and duct 52—and acts to cause the corresponding valve member $k^3$ to move to the position in which it closes the corresponding atmospheric port 22 and opens the corresponding chamber $k$ to the corresponding suction chamber $k^1$, thus placing the corresponding end portion $c^*$ of the casing or cylinder C under suction. Since the end portion $c^{}$ of said cylinder is under atmospheric pressure at this time, through chamber $k$ of valve unit $K^3$ and duct 63, it follows that the piston C' will be forced by the preponderating (atmospheric) pressure in the said end portion $c^{}$ to move the piston C' toward the end portion $c^*$ and thereby move the member $a$ of the transmission mechanism into the seat $a^2$ of the shift bar $a^4$ for the remainder of the shifting operation into "second".

When the shift into "second" has been completed, the master control valve I is again closed, whereupon the valve members $k^3$ of the several valve units K, $K^1$, $K^2$ and $K^5$ which were operated in effecting said shift, and also the valve member $j^1$, return to their respective original positions, but the remaining valves (namely, $h^1$, $m^1$ and $l^1$) and also the pistons B′ and C′ remain in the positions to which they were moved in the previous operation.

In order to initiate the shift from "second" to "high" the clutch is released and the master control valve I is again opened causing air at atmospheric pressure again to rush into the chamber $k^2$ of valve unit K and the corresponding valve member $k^3$ to close the corresponding atmospheric port 22 and open the chamber $k^1$ common to the several valve units $K^1$–$K^5$, to suction. When the speed of the vehicle and the speed of the pump $M^1$ has been accelerated to that at which the shift into "high" may be made without clashing of the gears, predetermined, as before suggested, by the setting of the needle valve 48, the valve member $m^1$ will be moved to the position in which its port 41 registers with the duct 5 and branch duct $9^a$. When the valve member $j^1$ is in the position shown in Fig. 10, the duct 5 is in communication with the port 33, through the port 18 in the valve member $h^1$ and the duct 6, and the branch duct $9^a$ are in communication with the port 35 of said valve member $j^1$ through the duct 9, port 20 in the valve member $h^1$ and the duct 10. At this time, the ducts 51–54 are closed.

As soon as the pressure of the air in the chamber $k^1$ common to the several valve units $K^1$–$K^5$ has been reduced, as the result of the described operation of the valve member $k^3$ of the unit K, the valve member $k^3$ of the unit $K^5$ will be operated to close the corresponding atmospheric port 22 and to open communication of the corresponding chamber $k$ with the suction chamber $k^1$, since the chamber $k^2$ of the latter unit ($K^5$) is under atmospheric pressure through the branch duct 56′, duct 56, port 40 in valve member $l^1$ of unit L and port 39 in the casing member of said unit L. Hence, the pressure of the air in the corresponding end of the casing member $j$ of the unit J is reduced to below that of the atmosphere and the valve member $j^1$ of said unit is forced by the preponderating atmospheric pressure at the opposite end of said member to the position in which its port 33 is in communication with ducts 6 and 52 and its port 35 is in communication with ducts 10 and 54. It will thus be seen that as soon as the valve member $j^1$ has been moved to the latter position the valve members $k^3$ of the respective units $K^2$ and $K^4$ will be moved to their positions in which they close the corresponding atmospheric ports 22 and open the corresponding ends $c^*$ and $b^{**}$ of the casings or cylinders C and B to suction from the chambers $k$ of said valve units through the ducts 62 and 61, respectively. Since the end portions of the casings or cylinders on the opposite sides of the pistons B′ and C′ are at this time under atmospheric pressure, through the ducts 60 and 63 and the chambers $k$ of the respective valve units $K^1$ and $K^3$ it follows that the pistons B′ and C′ will be moved in the directions shown by the arrows Fig. 13 and by their said movements will cooperate, through their described connections with the member $a$ of the transmission mechanism, in the shifting of the gears from "second" into "high".

As soon as the shift from "second" to "high" has been completed, the master control valve I is closed thus, as before explained, cutting off communication between the chamber $k^2$ of the valve unit K with the atmosphere and permitting the valve member $k^3$ of said unit to move to the position in which the corresponding atmospheric port 22 is opened and the corresponding suction port 23 is closed, thereby again opening communication between the chamber $k^1$ common to the several valve units $K^1$–$K^5$ and the atmosphere through the port 26, and the chamber $k$ and atmospheric port 22 of unit K. This in turn results in movement of the valve member $k^3$ of unit $K^5$ to the position in which the corresponding atmospheric port 22 is opened and the corresponding suction port 23 is closed, thereby counterbalancing the atmospheric pressure on opposite ends of the valve member $j^1$ by admitting atmospheric air into the corresponding end of the casing $j$ through the port 22 and chamber $k$ of valve unit $K^5$ and duct 55, thus causing said valve member $j^1$ to be moved to its initial position by the spring $j^2$. In this movement of the valve member $j^1$ the ducts 52 and 54 are closed to the atmosphere and hence the valve members $k^3$ of the units $K^2$ and $K^4$ will move to their positions in which the corresponding atmospheric ducts 22 are opened and the corresponding suction ducts 23 are closed, thereby restoring the atmospheric balance of pressures in the chambers $c^*$ and $c^{**}$ of the cylinder or casing C and in the chambers $b^*$ and $b^{**}$ in the cylinder or casing B.

The several parts mentioned remain in this condition throughout the entire movement of the vehicle in "high" gear, since any increase of the speed of operation of the pump $M^1$, resulting from corresponding increase in the speed of operation of the vehicle, does not increase the pressure of the liquid upon the piston $m^3$, the increase in the speed of flow of the liquid being taken care of by the needle valve 48 which has been set to by-pass the liquid through the ducts 47 and 46 back to chamber $M^5$ and also to cause the drainage back into said chamber, through the branch duct 50 and the upper end of duct 46, of any liquid in the casing $m$ which would create excessive pressure upon said piston. The pressure of the liquid upon the piston $m^3$ is thus maintained substantially constant, regardless of the speed of the vehicle, when the gears are in "high" and until the speed of the vehicle, and consequently that of the pump, drops to the point at which the pressure of the liquid exerted upon the piston $m^3$ falls below that at which the valve member $m^1$ was moved to its position in which the shift from "second" to "high" was made. In such case, the pressure of the spring $m^2$ becomes effective to move said valve member $m^1$ to re-establish communication of the port 41 with duct 3 and branch duct $5^a$ whereupon, when the clutch is again released and the master control valve I is again opened, the mechanism will be operated to shift the gears automatically back into "second". In this movement, the piston B′ will be moved in the direction opposite that in which it was moved in shifting from "second" to "high" and the pressure in the end portion $c^{**}$ of casing or cylinder C will urge piston C′ in the same direction as when the shift was made from "second" to "high" for the reason that member $a$ must be maintained in notch $a^2$ of shift bar $a^4$ in the movement of said bar to shift the gears into both "second" and "high". Similarly, when the speed of the vehicle drops to the point at which the pressure on the piston $m^3$ is insufficient to maintain said piston in the position in which its port 41 is in registration with duct 3 and branch duct $5^a$ and the spring $m^2$ becomes effective to move said piston to its initial position, the mechanism will operate automatically, upon release of the clutch and the opening of the master control valve I, to shift the gears from "second" to "low", the piston B' in this case moving in the direction opposite that in which it was moved in shifting from "low" to "second".

When it is desired to stop the vehicle with the gears in neutral the lever $h^2$ should be turned to the position in which the hand $h^5$ hereof points to Neut. on the dial $h^4$, after which the master control valve I is opened upon releasing the clutch in a manner heretofore explained. Atmosphere will now be admitted to chamber $k^2$ at valve unit K through port $i^2$, duct 1, recess 13, and duct 2 whereupon valve $k^3$ of valve unit K will close port 22 and open port 23 thus placing chamber $k^1$ common to valve units $K^1$-$K^5$ under suction.

It is to be here noted that when valve member $h^1$ has been moved to the Neut. position communication of chamber $k^2$ of each of valve units $K^1$-$K^5$ with the atmosphere is cut off since no ports in valve member $h^1$ are in a position to place ducts 3, 5, 7 and 9 in communication with ducts 4, 6, 8 and 10 respectively. Atmosphere may however be admitted to chamber $k^2$ of either of the valve units $K^1$ or $K^4$ through valves L and J and interconnecting ducts 57, 51ª and 51 or ducts 58, 54ª and 54.

Thus if the gears are in "low" at the time the valve $h^1$ has been moved to Neut. position the valve member $l^1$ will be to the right of its central or neutral position indicated in Fig. 10 and accordingly duct 57 will be in communication with atmosphere through valve casing $l$ which will admit atmosphere to chamber $k^2$ of valve unit $K^1$ through ducts 57, 51ª and 51 and valve $k^3$ of this unit will accordingly close port 22 and open port 23 and thus admit suction to end portion b* in cylinder B at which time atmosphere will be admitted to end portion b** in cylinder B and piston B' will be moved to the left (Fig. 10) to a position in which channel 40 in valve $l^1$ registers with port 39 and duct 56.

If on the other hand, the gears be in Rev. when valve $h^1$ has been moved to Neut. position valve $l^1$ will be to the left of the position indicated in Fig. 10 and duct 58 will be open to atmosphere through valve casing $l$. This will admit atmosphere to chamber $k^2$ of valve unit $K^4$ through ducts 58, 54ª and 54 and thus valve $k^3$ of this unit will close port 22 and open port 23 and thus admit suction to end portion b** and thus due to the admission of atmosphere to end portion b* through valve unit $K^1$ piston B' will be moved to the right (Fig. 10) to a position in which channel 40 again registers with port 39 and duct 56.

It will be noted that piston C' is not influenced in the above described movements since in going into Neut. or unmeshing of the gears the shift bars $a^4$ or $a^5$ need only be moved longitudinally in the direction depending upon the position of the gears before going into Neut.

When the vehicle is to be parked the lever $h^2$ should be turned to the position in which the hand $h^5$ points to Off in which position communication of ducts 1, 3, 5, 7, 9 and 2, 4, 6, 8 and 10 respectively is cut off through valve $h^1$.

It is preferred, in practice, to provide an inconspicuous and appropriate locking means for preventing the movement of said lever to an operative position by an unauthorized person.

In going from neutral to reverse, the operator first turns the lever $h^2$ to the position in which the hand points to Rev., thus correspondingly turning the valve member $h^1$ of the preparatory means H to the position in which the ports 15 and 16 have communication with the atmosphere through the ports 11 and 12 in the casing $h$ and respectively register with the ducts 4 and 8. At this time, the ducts 1 and 2 have communication with each other through port 14 in said valve member $h^1$, as shown Fig. 14. Thus, as soon as the engine has been started, the chamber $k^1$ of valve unit K will be exhausted so that upon the opening of the master control valve I the valve member $k^3$ of said valve unit (K) will be operated to close the corresponding duct 22 and open the chamber $k^1$ common to the several valve units $K^1$-$K^5$ to suction, all as previously explained. Since the ducts 4 and 8 were opened to the atmosphere by the adjustment of the lever $h^3$ to Rev., it follows that as soon as the chamber $k^1$ common to the several valve units $K^1$-$K^5$ is under suction, valve $j^1$ will be moved in the manner heretofore described and thus put ports 32 and 34 therein in communication with ducts 4 and 51 and 8 and 53 respectively, whereupon valve members $k^3$ of the respective valve units $K^1$-$K^3$ will be operated to close the corresponding atmospheric ports 22 and open the corresponding suction ports 23, since at this time air at atmospheric pressure reaches the chamber $k^2$ of valve unit $K^1$ through ports 11 and 15, duct 4, port 32 and duct 51 and air at atmospheric pressure reaches the chamber $k^2$ of valve unit $K^3$ through ports 12 and 16, duct 8, port 34 and duct 53. The closing of the atmospheric port 22 of chamber $k$ of valve unit $K^1$ results in the exhausting of the air in the end portion of the chamber b* of the cylinder or casing B and the closing of the atmospheric port 22 of the valve unit $K^3$ results in the exhausting of the air in the end portion c** of the casing or cylinder C. Thus, the pistons B' and C' are moved in the directions of the arrows shown in Fig. 14 and impart corresponding movement to the member $a$ of the transmission mechanism through the connections hereinbefore described, thereby placing the gears into intermeshing relationship appropriate for rearward movement of the vehicle. When the gears have been thus intermeshed, the master control valve I is again closed, whereupon the valve member $k^3$ of the valve units $K^1$ and $K^3$ return to their former positions in which the corresponding atmospheric ports 22 are opened and the corresponding suction ports 23 are closed. It will be understood that when the end portions b* and c of the casings or cylinders B and C are under suction, the end portions b and c* contain air at atmospheric pressure, thus causing the pistons B' and C' to move, and that when, as the result of the closing of the master control valve I both end portions of each of cylinders B and C are in communication with the atmosphere and said pistons B' and C' will be subjected to counterbalancing (atmospheric) pressures and will remain in the positions to which they have moved in effecting intermeshing relationship of the gears for rearward movement of the vehicle until the lever $h^2$ has again been adjusted to Neut.

From the foregoing it will be apparent that all the labor of manually shifting the gears is eliminated, since all the movements imparted to the transmission mechanism by said manually operated lever are automatically accomplished by the hereinbefore described mechanism. It will also be apparent that clashing of the gears which not only is unpleasant to the ears but also shortens the lives of the gears is avoided. The operator of the vehicle is only required, according to the described embodiment of the invention, to release the clutch between each shifting operation, the clutch pedal being arranged to open the master control valve I and to permit said valve to close automatically upon release of the pressure imposed by the operator on said clutch pedal. The only additional operation which the driver of the vehicle need perform is the preliminary adjustment of the lever $h^2$ to predetermine whether the movement of the vehicle shall be in a forward or rearward direction. When this lever has been once set for forward movement of the vehicle the shifting operations into "low" and into "second" and into "high" are wholly automatic when the clutch has been released for each of these operations.

The embodiment of the invention shown in Fig. 15 is similar to the embodiment illustrated in Figs. 1–14 except for changes in certain of the details which do not affect the principle of operation. Thus, it will be noticed that the valve, marked $j^{11}$, which corresponds to the valve $j^1$ of the previously described embodiment, is formed with only four ports, respectively marked 30', 31', 32' and 33', which correspond to the ports 30–35 in the previous embodiment, and with an atmospheric port 35' which corresponds to the ports 36 and 38 in said previous embodiment. Moreover, this valve, instead of being slidably mounted in a guiding and supporting case having an atmospheric port in one of its ends and its opposite end portion closed and provided with a spring engaging the corresponding end of the valve is slidably mounted in and guided by a channeled supporting block $j^{10}$ having flanges $j^*$ extending toward each other and upon which the bottom surface of the valve rests, and said block is open at both of its opposite ends and one end of the valve is engaged by a spring $j^{12}$ and the opposite end of the valve is connected by a stem $j^{13}$ to a piston $j^{14}$ which operates within a chamber $j^{15}$ whose end adjacent the valve is open and whose opposite end is closed.

In this particular embodiment the valved control means, marked $L^{10}$, is functionally similar to but structurally somewhat dissimilar from, the corresponding part L of the previously described embodiment. Its valve $l^{11}$ travels upon the outside of a supporting block $l^{10}$ in a guided relation with said block, being formed to substantially embrace the block, as indicated. This valve is provided with a port $l^{12}$ which corresponds to the port 40 in the previously described embodiment and the supporting block $l^{10}$ is formed with three spaced ports from which ducts 56ª, 57ª and 58ª respectively extend. The duct 57ª extends into operative relationship with the port 31' of the valve member $j^{11}$; the duct 58ª extends into operative relationship with the port 32' in said valve member $j^{11}$; and the duct 56ª extends to a duct 59ª one of whose ends enters the chamber $k^2$ of the valve unit K⁵ and the other of whose ends enters the block $j^{10}$ into operative relation with the valve $j^{11}$.

The preparatory valve means H, the several valve units K–K⁵, inclusive, the casings B and C, the pistons B' and C' and the connections between said pistons and the member $a$ of the transmission mechanism are all identical with the corresponding parts of the previously described embodiment. The hydraulically operated valve, marked $m^{11}$, is structurally identical with the corresponding valve $m^1$ of the previously described embodiment but is connected by a stem $m^{12}$ with a piston $m^{13}$ which operates within a casing $m^{14}$ separate from the casing $m^{15}$ in which the valve operates. The pump M¹ and the chamber M⁵ of the previous embodiment are employed in this particular embodiment and are connected with each other and with the piston chamber $m^{14}$ through ducts 45', 44', 46'' and 47' arranged as shown to correspond in function with the ducts which connect the pump, chamber $m$ and chamber $m^5$ with each other in the previously described embodiment. In this particular embodiment the needle valve, marked 48', is mounted in the duct 47' which connects the ducts 44' and 46' with each other.

Ducts, herein marked 1'–10', respectively corresponding to the ducts 1–10 of the previously described embodiment are employed in this embodiment, but their correlations with the valve $j^{11}$ and the valve $m^{11}$ have been changed somewhat. Thus, it will be noticed that the ends of the ducts 4', 6', 8' and 10' opposite the valve $h^1$ enter the member $j^{10}$ at places which cause said ends to be closed when the valve $j^{11}$ is in its neutral position, shown in Fig. 15, and to be opened (by the ports 30', 31', 32' and 33') when said valve has been moved to the position it occupies during the shifting operations. It will also be noticed that the duct 7' has two branches 7ª and 7ᵇ, that the duct 3' and the branch duct 7ª have communication with each other when the valve member $m^{11}$ is in its initial position, that the duct 9' has two branches, respectively marked 9ª¹ and 9ª², and that the duct 5' is so arranged with relation to said branch duct 9ª² is to have communication with the latter through the port 41' when the valve $m^{11}$ is in its position for shifting into "second" gear and that the branch ducts 7ᵇ and 9ª¹ are so arranged as to have communication with each other through said port 41' when the valve member $m^{11}$ is in its position for shifting into "high" gear.

It will further be noticed that when the parts are in the said neutral position the port 30' of the valve $j^{11}$ is in communication with the chamber $k^2$ of the valve unit K¹ through a duct 51' and that the chamber $k$ of said valve unit (K¹) has communication with the atmosphere through its port 22 and with the end portion $c^{**}$ of the casing or cylinder C through a duct 63'; that the port 31' of said valve $j^{11}$ has communication with the valved control means L¹⁰ through the duct 57ª and with the chamber $k^2$ of the valve unit K² through duct 52' and that the chamber $k$ of said valve unit (K²) has communication with the atmosphere through its port 22 and with the end portion $b^*$ of the casing or cylinder B through the duct 60'; that the port 32' of said valve $j^{11}$ has communication with said valved control means L¹⁰ through the duct 58ª and with the chamber $k^2$ of the valve unit K³ through the duct 53' and that the chamber $k$ of said valve unit (K³) has communication with the atmosphere through its port 22 and with the end portion $b^{**}$ of the casing or cylinder B through duct 61'; that the port 33' of said valve $j^{11}$ has communication with the chamber $k^2$ of the valve unit K⁴ through the duct 54' and the chamber $k$ of said valve unit (K⁴) has communication with the atmosphere through its port 22 and the end portion $c^*$ of the casing or cylinder C through the duct 62'; and that the chamber $k$ of the valve unit K⁵ has communication with the atmosphere, through its port 22, and with the piston chamber $j^{15}$, through duct 55', and the chamber $k^2$ of said valve unit ($K^5$) has communication with the atmosphere through the upper end of duct 59ᵃ, duct 56ᵃ and port $l^{12}$ of valve $l^{11}$. It will also be noticed that at this time the lower end portion of duct 59ᵃ is closed by the corresponding end of the valve $j^{11}$ and the ends of ducts 4', 6', 8' and 10' are closed by the parts of said valve intermediate the ports.

The operation of the parts in this particular embodiment of the invention will be understood to be as follows, namely:

When the lever $h^2$ has been moved to Forw. and the engine has been started and the clutch has been released and the master control valve has been opened, air at atmospheric pressure will flow (through the duct $l^1$, port 14', shown in Figs. 10–13, and duct 2') into the chamber $k^2$ of the valve unit K and, since the chamber $k^1$ of this valve unit is under suction, the corresponding valve member $k^3$ will be operated to close the corresponding atmospheric port 22 and open the corresponding suction port 23, thereby placing the chamber $k^1$ common to the several valve units $K^1$–$K^5$ under suction, through port 26, all as has been explained in connection with the previously described embodiment. This causes the valve member $k^3$ of the valve unit $K^5$ to close the corresponding atmospheric port 22 and open the corresponding suction port 23, whereupon piston chamber $j^{15}$ will be exhausted, through duct 55', chamber $k$ of valve unit $K^5$ and chamber $k^1$ common to the valve units $K^1$–$K^5$, port 26, chamber $k$ of valve unit K, port 23 of the latter unit and duct O. The consequent reduction in the pressure of the air in said piston chamber $j^{15}$ makes the spring $j^{12}$ effective to move the valve $j^{11}$ into the position in which the ducts 51' and 4' are in communication with each other through the port 30', the ducts 52' and 6' are in communication with each other through the port 31', the ducts 53' and 8' are in communication with each other through the port 32' the ducts 54' and 10' are in communication with each other through the port 33' and the atmospheric port 35' is in registration with the lower end of the duct 59ᵃ. Air at atmospheric pressure accordingly will enter the duct 30' through the ports 42' and 41' in the valve $m^{11}$, duct 3' port 17 and duct 4' and will flow from said port 30' into the chamber $k^2$ of valve unit $K^1$ through duct 51'. At this same time, air will flow into the port 32' of said valve $j^{11}$ through the branch duct 7ᵃ, duct 7', port 19 and duct 8' and will flow from said port 32' to the chamber $k^2$ of valve unit $K^3$ through the duct 53'. The valve members $k^3$ of valve units $K^1$ and $K^3$ respectively will thus be operated to close the corresponding atmospheric ports 22 and open the corresponding suction ports 23, thereby reducing the pressure of the air in the end portions $c^{}$ and $b^{}$ of the cylinders C and B, through the ducts 63' and 61'. Since at this time the valve member $k^3$ of the valve units $K^2$ and $K^4$ are in their positions in which the corresponding atmospheric ports 22 are open and the corresponding suction ports 23 are closed, for the reason that the ports 31' and 33' are closed against the atmosphere through valve $m^{11}$, it follows that the pistons B' and C' will be moved by the preponderating air pressure in the end portions $b^*$ and $c^*$ in the casings or cylinders B and C and that these movements will be transmitted to the bar E in the direction which causes the member $a$ of the transmission mechanism to shift the gears into "low". In this movement the valve $l^{11}$ is moved and its port $l^{12}$ is thereby carried out of registration with duct 56ᵃ, but atmospheric pressure in the chamber $k^2$ of valve unit $K^5$ is maintained through port 35' and duct 59ᵃ.

The shift into "low" having been thus accomplished, the clutch is reengaged and the master control valve is again closed, thereby cutting off communication of the chamber $k^2$ of the valve unit K with the atmosphere through ducts 2' and 1', whereupon the corresponding valve member $k^3$ will return to its former position, thus opening the corresponding chamber $k$ to the atmosphere through port 22, and also opening the chamber $k^1$ common to the several valve units $K^1$–$K^5$ to the atmosphere through the port 26, the chamber $k$ of valve unit K and the atmospheric port 22 of the latter unit. The valve members $k^3$ of the units K, $K^1$ and $K^3$ which were operated in the preceding operation now return to their former positions, thereby bringing about a counterbalancing of the pressures (atmospheric) on opposite sides of the pistons B' and C', thus maintaining the gears in "low" and also opening the piston chamber $j^{15}$ to the atmosphere through duct 55' and chamber $k$ and atmospheric port 22 of valve unit $K^5$, thereby returning the valve member $j^{11}$ to its initial position.

At this time duct 57ᵃ will be in communication with atmosphere since valve $l^{11}$ was moved to the right in Fig. 15 in shifting into "low" and accordingly chamber $k^2$ of valve unit $K^2$ will be under atmospheric pressure through duct 57ᵃ, port 31' and duct 52' which will result in movement of valve $k^3$ of valve unit $K^2$ to close the port 22 and open port 23 and thus place end portion $b^*$ of cylinder B under suction through duct 60' and this in turn will result in movement of piston B' moving toward the end portion $b^*$ of casing or cylinder B since atmosphere is being admitted to the end portion $b^{**}$ through port 22 of valve unit $K^3$ and duct 61'. This movement of piston B' will correspondingly move valve $l^{11}$ in the direction which will put its port $l^{12}$ again in registration with duct 56ᵃ so that atmosphere will be admitted to chamber $k^2$ of valve unit $K^5$ through ducts 56ᵃ and 59ᵃ, thereby causing movement of valve $k^3$ of this unit to close the corresponding port 22 and open the corresponding port 23, whereby suction will again be admitted to chamber $j^{15}$ and valve $j^{11}$ will be moved in the direction which establishes communication between the ducts leading from the preparatory means H and those leading to chamber $k^2$ of each of the valve units $K^1$–$K^4$, in the manner heretofore described.

While the vehicle is moving with its gears in "low", pressure will be built up in the duct 44' to that, predetermined by the setting of the needle valve 48', at which the valve $m^{11}$ shall be moved to cause its port 41' to register with the branch duct 9ᵃ² and duct 5', thereby opening communication of chamber $k^2$ of valve unit $K^2$ with the atmosphere through duct 52', port 31', duct 6', port 18, duct 5', and ports 41' and 42' and at the same time opening communication of chamber $k^2$ of valve unit $K^4$ with the atmosphere through duct 54', port 33', duct 10', port 20, duct 9', branch duct 9ᵃ² and ports 41' and 42'. This results in the closing of the atmospheric ports 22 and the opening of the suction ports 23 of said valve units $K^2$ and $K^4$, thereby reducing the pressure of the air in the end portions $b^*$ and $c^*$ of the casings or cylinders B and C, whereupon the pistons B' and C' will be operated to move the gears out of "low" and into "second" in the same manner as that brought about in the previously described embodiment. When the gears have been thus intermeshed for movement of the vehicle in "second" the clutch is again reengaged and the master control valve is again closed, whereupon the valve $j^{11}$ and the valve members $k^3$ of the units K, $K^2$, $K^4$ and $K^5$ which were operated in the shifting of the gears into "second" again return to their initial positions.

When it is desired to shift into "high" the speed of the engine is accelerated, the clutch is again released and the master control valve is again opened; whereupon air at atmospheric pressure will again be admitted to the chamber $k^2$ of the valve unit K, and the chamber $k^1$ common to the several valve units $K^1$–$K^5$ will be placed under suction. Atmosphere will be admitted to chamber $k^2$ of valve unit $K^3$ through duct $58^a$, port 32' and duct 53', since said duct $58^a$ was opened by movement of the valve $l^{11}$ in shifting into "second", and accordingly piston B' will be moved toward its end portion $b^{**}$ in the manner before described, thus moving valve $l^{11}$ therewith until port $l^{12}$ again communicates with duct $56^a$, at which time valve member $k^3$ of valve unit $K^5$ will again become operative to cause movement of the valve $j^{11}$ into operative shifting position.

When the pressure for the shifting operation into "high", predetermined by the setting of the needle valve 48' has been reached, the valve $m^{11}$ will have been correspondingly moved to position its port 41' in registration with branch ducts $7^b$ and $9^{a1}$. The valve $j^{11}$ having been moved to its operative position for the shift into "high", its port 32' will be in communication with the atmosphere through duct 8', port 19, duct 7' and branch duct $7^b$ and ports 41' and 42', and its port 33' will be in communication with the atmosphere through duct 10', port 20, duct 9', branch duct $9^{a1}$ and said ports 41' and 42'. At this same time, the port 32' is in communication with the chamber $k^2$ of valve unit $K^3$ and the port 33' is in communication with the valve member $k^2$ of valve unit $K^4$, thereby causing the valve $k^3$ of said units $K^3$ and $K^4$ to close the corresponding atmospheric ports 22 and open the corresponding suction ports 23 and hence opening the end portions $b^{**}$ and $c^*$ of the respective casings or cylinders B and C to suction through ducts 61' and 62'. This results, as will be understood, in the shifting of the gears into "high".

When the gears have been thus shifted into "high" the clutch is again reengaged and the master control valve is again closed, whereupon the valve members $k^3$ of the units K, $K^3$, $K^4$ and $K^5$ and the valve $j^{11}$ are all returned to their former positions.

When the gears are in "high" any acceleration of the speed of the vehicle does not affect the position of the valve $m^{11}$, since the increased speed of the pump and consequently the increased speed in the flow of the liquid are taken care of by the ducts which drain liquid back into the chamber $M^5$, as in the previously described construction.

It will be understood, that all the foregoing operations are merely reversed in going from "high" to "second" and/or from "second" to "low", and that it will be necessary only for the operator to release the clutch and open the primary control valve, whereupon the gears will automatically be shifted back into the next lower ratio thereof when the speed of the vehicle falls to that proper for the shift to be made.

When the vehicle is to be parked, the lever $h^2$ should be turned to the position in which the hand $h^5$ points to Neut. if the ducts 1' and 2' are to remain in communication with each other, or to Off if all the ducts are to be closed.

In order to go from neutral to reverse, the operator first turns the lever $h^2$ to the position in which the hand points to Rev., thus correspondingly turning the valve member $h^1$ of the preparatory means to the position in which the port 14 of said valve (see Fig. 14) is in communication with the ducts 1' and 2' and the ports 15 and 16 of said valve are in communication with ducts 4' and 6'. Hence, when the engine is started, the clutch released and the master control valve opened, air at atmospheric pressure will enter chamber $k^2$ of valve unit K and the valve member $k^3$ of said unit will be operated to close the corresponding atmospheric port 22 and open the corresponding suction port 23, thereby placing the chamber $k^1$ common to the several valve units $K^1$–$K^5$ under suction, all as before described. At this time the valve member $k^3$ of the valve unit $K^5$ is operated to close the corresponding atmospheric port 22 and open the corresponding suction port 23, thereby reducing the pressure of the air in the piston chamber $j^{15}$. The air at atmospheric pressure which enters the chamber $k^2$ of the valve unit $K^5$ in this operation flows into said chamber through port $l^{12}$ and ducts $56^a$ and $59^a$. Reduction of the pressure of the air in the piston chamber $j^{15}$ causes the valve $j^{11}$ to be moved by the spring $j^{12}$ as before described. This movement of the valve $j^{11}$ places its port 30' in communication with duct 4' without closing communication of said port with duct 51' and also places its port 31' in communication with duct 6' without closing communication of said port 31' with duct 52'. Hence, air at atmospheric pressure will enter duct 30' through port 15 and duct 4' and will flow from said port 30' to the chamber $k^2$ of valve unit $K^1$ through duct 51'. At the same time, air at atmospheric pressure will enter the port 31' through the port 16 and duct 6' and will flow from said port 31' into the chamber $k^2$ of valve unit $K^2$ through the duct 52'. Consequently, the valve members $k^3$ of valve units $K^1$ and $k^2$ will be moved to close the respective atmospheric ports 22 and open the respective suction ports of said valve units, thereby reducing the pressure of the air in the end portions $c^{**}$ of the casing or cylinder C and the pressure of the air in the end portion $b^*$ of the casing or cylinder B, whereupon the pistons C' and B' will be moved toward said end portions by the preponderating atmospheric pressure in the end portions ($c^*$ and $b^{**}$) of said casings or cylinders on the opposite sides of the pistons, thus throwing the gears into mesh for rearward movement of the vehicle through the hereinbefore described connections between said pistons and the member $a$ of the transmission mechanism. When the reverse gears have been thus intermeshed, the clutch is again engaged and the master control valve is again closed, and if it now be desired to have the vehicle moved in a forward direction, the lever $h^2$ is moved to Forw. and the parts are now ready for the shifting of the gears into "low".

It will be noted that in this particular embodiment, shown in Fig. 15, ports 11, 12, 15 and 16 are arranged in closer relation than in the previously described embodiment of the invention since ducts 4' and 6', instead of ducts 4 and 8, communicate with ports 15 and 16.

In the foregoing statements with respect to the correlation of the parts and the operation thereof no reference has been made to the form of power applying means shown in Fig. 17 and previously described, in which the power applying members are diaphragms, respectively marked $b^{100}$ and $c^{100}$. It will be understood, however, that these diaphragms and appropriate chambers therefor may be employed in either of the previously described embodiments, and also in the electro-pneumatic system, shown in Figs. 18 and 19 and hereinafter described.

Figure 6:
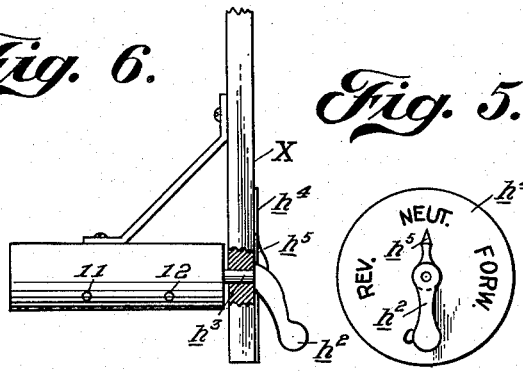
Fig. 6 is a detail side view showing the said operating device and dial, together with the member operated by said lever to selectively control certain pneumatic connections embodied in the mechanism.
Figures 5, 7:
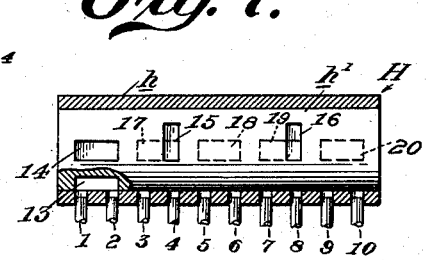
Fig. 5 is a front elevation of the operating device of the "preparatory means" and the dial associated therewith, employed in all illustrated embodiments of the system, for preliminarily arranging the connections for the automatic shifting of the gears into those appropriate for forward or rearward movement of the vehicle, respectively.
Fig. 7 is a detail sectional view of said member as designed for the control of pneumatic connections in one illustrated embodiment of the invention.
Figure 1:
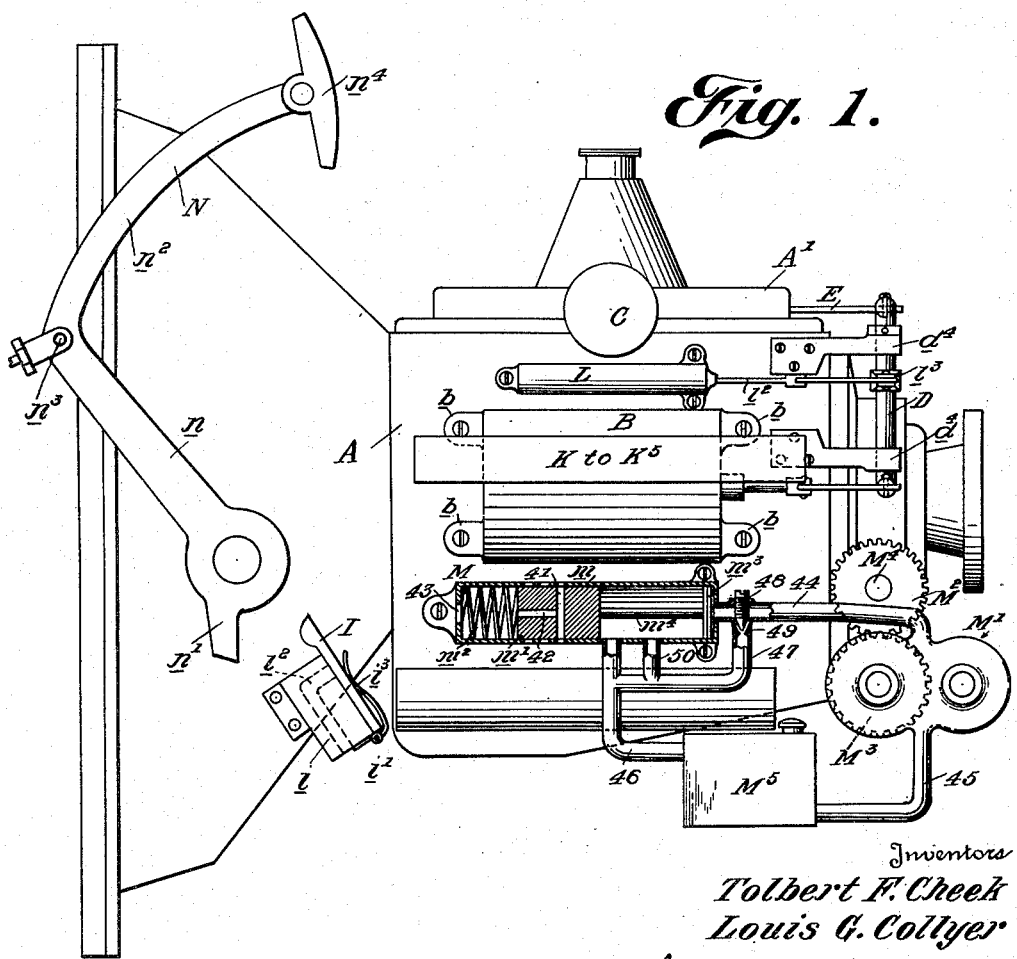
Fig. 1 is a side elevation.
Figure 2:
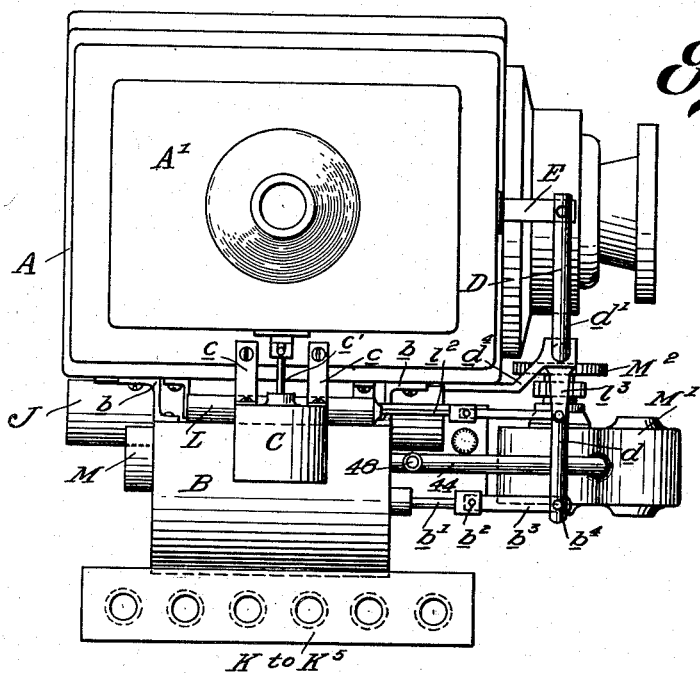
Fig. 2 is a top plan view and Fig. 3 is an end elevation, of the casing which, in practice, encloses a standard automobile or truck transmission mechanism, for example, showing various parts of one embodiment of our gear shifting mechanism applied to said casing, Fig. 1 also showing the master control means and the preferred means for controlling the same.
Figure 3:
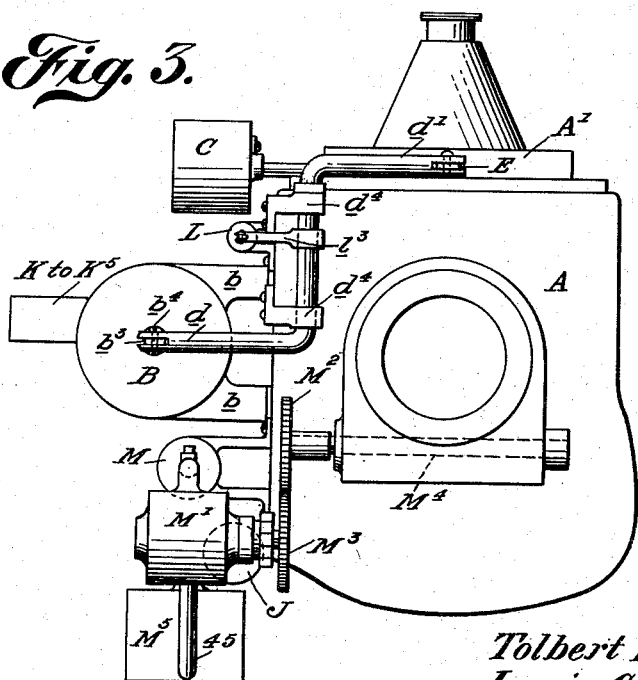
Figure 16:
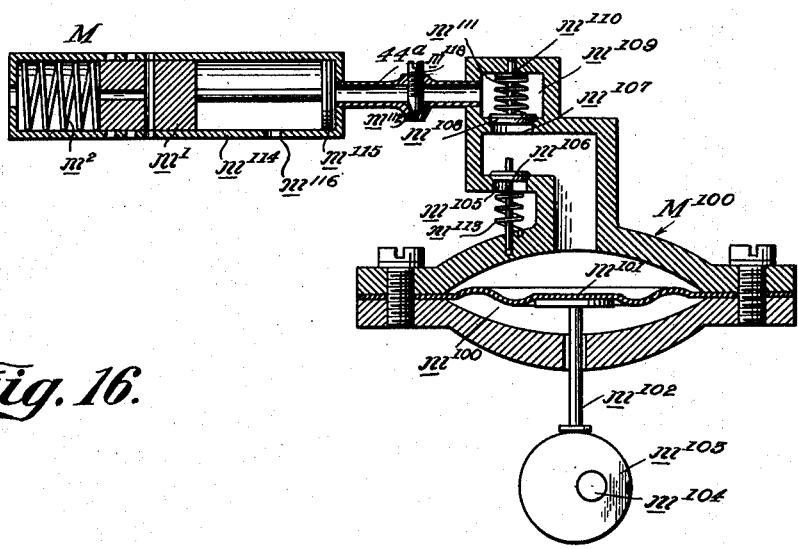
Fig. 16 is a detail representation of a pneumatic pump which may be employed for adjusting the valve which controls the times when shifting operations shall be performed to avoid clashing of the gears.

Moreover, the foregoing description sets forth a pump mechanism of hydraulic nature for adjusting the valvular member $m^1$ of the valvular means M, shown in one embodiment of the invention. It is not essential, however, that the pump mechanism employed for the purpose stated be of hydraulic nature. For example, said pump mechanism may, in either of the foregoing embodiments, be of pneumatic nature and a pump of the latter type is illustrated in Fig. 16. This pump comprises a casing $M^{100}$ having a chamber $m^{100}$ in which is mounted a flexible diaphragm $m^{101}$ which is engaged at one of its sides by one end of a stem $m^{102}$ whose opposite end is in engagement with a cam $m^{103}$, fixedly mounted on a shaft $m^{104}$ under control of the speed of the vehicle, as the speedometer shaft, for example. Vibratory motion is thus imparted to the diaphragm $m^{101}$ at varying speeds in accord with the speed of the vehicle and in its movement said diaphragm draws in air through the valve controlled inlet $m^{105}$, whose valve is marked $m^{106}$, and discharges the air through the port $m^{107}$ which is controlled by a valve $m^{108}$. Said valve $m^{108}$ is mounted in a chamber $m^{109}$ from which extends a duct 44a through which the air is discharged into the casing, marked $m^{114}$, against a piston, marked $m^{115}$, the said chamber and piston respectively corresponding to the casing $m$ or $m^{14}$ and the piston $m^3$ or $m^{13}$, of the previous described embodiments, to either of which this pneumatic pump is applicable. The stem $m^{110}$ of the valve $m^{108}$ is encircled by a spring $m^{111}$ which holds the valve body yieldably to its seat. The intake valve $m^{106}$ also is preferably provided with a spring, $m^{113}$, for holding it yieldably to its seat.

The duct 44a has a port $m^{112}$ controlled by a valve $m^{118}$, the said port and valve respectively corresponding in function to the port 49 and valve 48 of the previous embodiments (see Fig. 1) namely, for the discharge from said duct of all fluid (air in this particular instance) in excess of that, predetermined by the setting of the valve $m^{118}$, at which the shifting operations from low to second and from second to high respectively shall take place without clashing of the gears.

In operation, movement of the vehicle in low gear causes the diaphragm $m^{101}$ to be vibrated and thus draws in air, through the intake port $m^{105}$, and discharges it, through the outlet port $m^{107}$, into the duct 44a and against the piston $m^3$ or $m^{13}$, according to which of the previously described embodiments this pump is applied, thus gradually building up sufficient pressure in said duct to overcome the tension of the spring $m^2$ and adjust the valvular member $m^1$ (or $m^{11}$) the step which opens the connections for the shifting operation into second gear. In this operation, the tension of the spring is gradually increased and is overcome by further acceleration of the speed of the vehicle, in second gear until the pressure of the air becomes sufficient to move said valvular member, the step which open the connections for the shifting of the gears into high.

The portion of the piston casing $m^{114}$ inward of the extreme position assumed by the piston $m^{115}$ when the valvular member has been adjusted to its position for high gear is provided with one or more vents $m^{116}$ so that any increase in the pressure due to acceleration of the speed of the vehicle in high gear does not affect the position of said piston and consequently does not affect the position of the valvular member connected to said piston. It will be understood that if the speed of the vehicle drops below that at which said valvular member was moved for shifting of the gears into high and/or if it still further drops to below that at which the gears were shifted into second the reverse of the foregoing operations will automatically take place upon release of the clutch.

Reverting to the power applying means and particularly to the chamber C and piston C' shown in certain of the previously described embodiments and to the chamber $C^{100}$ and diaphragm $c^{100}$, shown in another embodiment, it should be understood that it is not wholly essential to employ means of such nature for accomplishing the purpose thereof, even when pneumatically operable means are employed to move the shift bars $a^4$ $a^5$ longitudinally, since any means which will satisfactorily perform the function of causing the member $a$ to be moved into the respective seats in said shift bars, whether of pneumatic or other nature, may be employed. However, we have found, in practice, that the pneumatically operable means hereinbefore set forth for this purpose is far more satisfactory than any means of a wholly mechanical nature with which we have experimented, such as a spring, for example, and hence we prefer the particular means illustrated, that is means whose operating member is responsive to variations in the relative pressures to which it is subjected.

The electro-pneumatic system diagramatically illustrated in Figs. 18 and 19 is fundamentally like those hereinbefore described, differing from the latter only in the substitution of means of electrical nature for controlling the variations in the pneumatic pressures to which the power applying means is subjected in effecting the shifting operations.

The power applying means in this particular embodiment of the invention may be identical with that of any one of the three previously described embodiments. As here shown, for exemplary purposes, it comprises a pair of chambers $B^{10}$ and $C^{10}$, respectively, pistons $B^{10'}$ and $C^{10'}$, respectively, a stem, $b^{10}$ projecting from the piston $B^{10'}$, a Z-shaped level $D^{10}$, a link $b^{30}$, one of whose ends is pivoted at $b^{20}$ to one end of the stem $b^{10}$ and the other of whose ends is pivoted at $b^{40}$ to the end portion $d^{10}$ of the lever $D^{10}$, a bar $E^{10}$ pivoted to the other end portion $d^{20}$ of said lever $D^{10}$ and having an enlarged end $E^{11}$ provided with an opening $e^{11}$ to receive the corresponding end of the bar $a$ of the transmission mechanism, a stem $c^{10}$ projecting from piston $C^{10'}$ and a link $c^{20}$ connecting said piston stem to the enlarged end $E^{11}$ of the bar $E^{10}$.

The casing or cylinder $B^{10}$ has its opposite end portions provided with ducts 60' and 61' and the casing or cylinder $C^{10}$ has its opposite end portions provided with ducts 62' and 63'. These ducts 60'–63' are like the ducts 60–63 in the previously described embodiment in every respect and flow of the air therethrough is automatically controlled to correspondingly vary the relative pneumatic pressures to which the pistons are subjected in the shifting operations through instrumentalities which correspond to those employed in the said previously described embodiments and which differ from the latter only in the changes in details necessary to adapt the mechanism to the use of electrical connections instead of pneumatic connections.

Thus, it will be noted that this particular embodiment also includes a preparatory means, designated $H^{10}$ as a whole, which utilizes the operating element, marked $h^{20}$ and the dial, marked $h^{40}$, employed in the preceding embodiments. This operating element is connected to a rotative member, marked $h^{10}$ which is a counterpart in every respect of the member $h^1$ of the preceding embodiments, except that bridging contacts, marked $h^{11}$ to $h^{13}$ and $h^{15}$ to $h^{18}$, inclusive and grounding contacts $h^{14}$ for controlling certain electrical circuits are employed, in lieu of the ports 13-20 controlling certain pneumatic ducts for selective operation in effecting various shifting operations.

The "master control" member in this embodiment, marked $I^{10}$, is an electrical switch arranged to be operated, as in the preceding embodiments, by the clutch pedal, marked $N^{10}$, said clutch pedal having a projection $n^{10}$, for operating the switch to close a corresponding circuit. The switch may be integral with the projection, in which case it will be opened as well as closed by the pedal, or it may be separate from the pedal, as indicated, in which case an appropriate spring $n^{30}$ should be employed to open it.

A means having provision for the passage of air therein and which corresponds in function to the series of valve units $K-K^5$ is employed in this embodiment. This means is designated $K^{10}$ as a whole and its structure includes a body or casing having elements, respectively marked $k^{10}$, $k^{11}$, $k^{12}$ and $k^{13}$, which as will hereinafter be described, selectively control communication of the ducts 60'-63' with the atmosphere through appropriate atmospheric ports $k^{14}$, $k^{15}$ and $k^{16}$ provided in said body or casing, and with a suction inducing part of the vehicle through a duct $O^{10}$ having branches $o^{10}$, $o^{11}$ and $o^{12}$ which enter said body or casing. The duct $O^{10}$ is preferably connected to the intake manifold of the engine. The elements $k^{10}-k^{13}$ in this embodiment constitute the cores of electro-magnets $k^{17}$, $k^{18}$, $k^{19}$ and $k^{20}$, respectively, and are electrically operated by said magnets which in turn are energized and deenergized by the means hereinafter set forth. These valvular members (cores) are respectively provided with channels $k^{21}$, $k^{22}$, $k^{23}$ and $k^{24}$, through which the ducts 63', 60', 61' and 62' severally have communication with the atmosphere, or with the suction inducing part, or are entirely closed against both the atmosphere and said suction inducing part according to the portions of said members. The valvular elements $k^{10}-k^{13}$ are respectively mounted in bores formed in the body or casing member of this particular part of the construction and the electro-magnets $k^{17}-k^{20}$ have their openings in registration with said bores. The cores $k^{10}$ to $k^{13}$ are maintained in normal position by springs $s$. The inner partitions or walls of the bores are ported to afford communication between the channels in the valvular elements $k^{10}-k^{13}$ and the several ducts 60'-63', as shown, and the outer walls of said body or casing member are formed with the ports $k^{15}$ and $k^{16}$ which open into the channels $k^{21}$ and $k^{24}$ in the outer valvular elements $k^{10}$ and $k^{13}$ when the latter are in the positions shown. The port $k^{14}$ is arranged between the valvular elements $k^{11}$ and $k^{12}$ and has lateral branches which communicate with the channels $k^{22}$ and $k^{23}$ in said valvular elements. The branch duct $o^{11}$ extends into the body or casing at a place located between the inner valvular elements $k^{11}$ and $k^{12}$ into communication with a suction port $k^{25}$ which is under control of said inner valvular elements. The branch ducts $o^{10}$ and $o^{12}$ enter the outer walls of the body or casing into operative relationship with the outer valvular elements $k^{10}$ and $k^{13}$, respectively.

This embodiment also includes a means which corresponds to the control means L or $L^{10}$ of the previous embodiments, respectively but which employs a reciprocatory switch arm, marked $l^{20}$, having a contact $l^{21}$ at one end and its other end connected to the end portion $d^{10}$ of the Z-shaped lever $D^{10}$ in a way similar to that by which the member $l^2$ in the preceding embodiments is connected to said lever. In this case, the switch $l^{20}$ controls certain electrical circuits which correspond to the ducts controlled by the valve $l^1$ or $l^{11}$ of the preceding embodiments.

This particular embodiment of the invention also includes a means, designated $J^{10}$ as a whole, which corresponds to the control means J of the preceding construction. This particular control means, however, employs a relay $j^{20}$ whose armature $j^{21}$ corresponds to the valve $j^1$ or $j^{11}$ of the previous embodiments, but is provided with bridging contacts, hereinafter particularly referred to for controlling electrical circuits instead of with ports for controlling pneumatic ducts.

This particular embodiment of the invention further employs a means operated under control of the speeds of the vehicle for arranging the connections to cause the shifts from low to second and from second to high and also from high to second and from second to low to be made only at those times when the gears are rotating at substantially the same speed and the shifts therefore can be made without clashing of the gears. This particular part of the mechanism comprises a piston casing $M^{10}$, a pump $M^{20}$ and a liquid containing chamber $M^{25}$, all of which are identical with the corresponding parts in the preceding embodiments and are connected with each other by the same means as those employed in said preceding embodiments. The pump also is preferably driven from the speedometer shaft through the gears, marked $M^{30}$ and $M^{40}$, as in said preceding embodiments. In this particular embodiment, however, the piston, marked $m^{10}$, which is mounted in the casing $M^{10}$ is connected to and imparts reciprocatory movement to a member, marked $m^{11}$, which has a switch arm $m^{12}$ projecting outward through the corresponding end of the casing and whose outer end is provided with a bridging contact to control certain electrical circuits instead of certain pneumatic ducts, as in the preceding embodiments.

When the gears are in neutral the operating parts and electrical connections therefor will be in the position shown in Fig. 18 in which the pneumatic pressures on opposite sides of the pistons $B^{10'}$ and $C^{10'}$ counterbalance each other, since at this time the ducts 60' and 61' have communication with the atmosphere through the port $k^{14}$ and the channels $k^{22}$ and $k^{23}$ in the inner valvular elements $k^{11}$ and $k^{12}$, and since the ducts 62' and 63' have communication with the atmosphere through the ports $k^{15}$ and $k^{16}$, respectively, and the channels $k^{21}$ and $k^{24}$ in the outer valvular elements $k^{10}$ and $k^{13}$, respectively.

When the motor is started, suction will be induced in the duct $O^{10}$ and its branch ducts $o^{10}$, $o^{11}$ and $o^{12}$ and when the clutch is released, through the pedal $N^{10}$, the switch $I^{10}$ will be closed, thus causing current to flow from battery Y through wire 100, contact 101, bridge contact $h^{11}$, contact 102, wire 103, wire 104, relay $j^{20}$, wire 105, wire 106, contacts 107 and $l^{21}$ and arm $l^{20}$, thus completing the circuit through ground y back to battery Y. If at this time the member $h^{10}$ of the preparatory means $H^{10}$ is in the Neut. position shown, no action of the valve parts occurs although wire 103 extends to the electro-magnet $k^{17}$ and has three branch connections (103$^a$, 103$^b$ and 103$^c$) to the electro-magnets $k^{18}$, $k^{19}$ and $k^{20}$, respectively for the reason that the electro-magnets are not in complete circuit, and hence are not energized, as the other wires connected therewith and hereinafter referred to are not in circuit through the preparatory means $H^{10}$. It is to be noted, however, that the armature $j^{21}$ is drawn up by the energizing of the relay $j^{20}$ upon the completion of the beforementioned circuit which, as will hereinafter appear, occurs in every shifting operation.

When it is desired to go into low gear the operator moves lever $h^{20}$ to the position marked Forw. on the dial $h^{40}$ thereby rotating member $h^{10}$ and moving the bridge contacts $h^{13}$, $h^{15}$, $h^{16}$, $h^{17}$ and $h^{18}$ into operative relation with the contacts 101, 102, 108, 109, 110, 111, 112, 113, 114, and 115 thereby closing the circuits through wires 100 and 103, 116 and 117, 118 and 119, 120 and 121 and 122 and 123, respectively.

The operator now disengages the clutch and thereby closes the switch $I^{10}$ causing current to flow from the battery Y through switch $I^{10}$, wire 100, contact 101, bridge contact $h^{13}$, contact 102, wires 103 and 104, relay $j^{20}$, wires 105 and 106, contacts 107 and $l^{21}$ and through arm $l^{20}$ to ground y and hence back to battery Y thus completing a circuit which energizes the relay $j^{20}$ and causes the armature $j^{21}$ to be moved upward with the insulated bridge contacts 124, 125, 126 and 127 carried thereby in operative engagement with contacts 128, 129, 130, 131, 132, 133, 134 and 135 thereby closing the circuits through wires 117 and 136, 119 and 137, 121 and 138 and 123 and 139, respectively.

It will be noted that the armature $j^{21}$ is provided with a contact or pole 140 which operatively engages a contact 141 on wire 106 whereby a circuit is closed through the armature to ground $y'$ which results in the armature being maintained in the above described circuit closing position upon separation of conducts 107 and $l^{21}$ while the shifting operation is being carried out.

In addition to the connections above described a contact 142 on the arm $m^{12}$ will be in operative engagement with contacts 143 and 144 on wires 116 and 120, respectively.

Current will now flow from battery y, through switch $I^{10}$, wire 100, contacts 101, $h^{13}$ and 102, wire 103, electro-magnet $k^{17}$, wire 136, contacts 124, 128 and 129, wire 117, contacts 109, $h^{15}$ and 108, wire 116, contacts 143, 142 and 144, wire 120, contacts 112, $h^{17}$ and 113, wire 121, contacts 132, 126 and 133, wire 138, electro-magnet $k^{19}$ and wire 145 back to wire 103. A circuit is accordingly completed through the windings of the electro-magnets $k^{17}$ and $k^{19}$ which will cause the cores or valve members $k^{10}$ and $k^{12}$ to move downwards and bring the channels $k^{21}$ and $k^{23}$ respectively into communication with ports $o^{10}$ and $o^{11}$ whereby suction will be admitted through ducts 63' and 61' to cylinders $C^{10}$ and $B^{10}$ on the sides of their respective pistons $C^{10\prime}$ and $B^{10\prime}$ indicated at $c^{}$ and $b^{}$ while at the same time atmosphere will be admitted to the cylinders on the opposite sides of the pistons through ports 62' and 60' which respectively communicate with ports $k^{16}$ and $k^{14}$ through channels $k^{24}$ and $k^{22}$. The gears will now be moved into low through the connections above described and in the same manner as in the previously described modifications. After the shift into low has been completed the clutch is again engaged and the vehicle starts moving which results in operation of pump $M^{20}$. Upon acceleration of the vehicle, the piston $m^{10}$ will move to the left and upon a predetermined acceleration the contact 142 will engage contacts 149 and 150 at which time upon closing of the switch $I^{10}$ current will flow through wire 100, contacts 101, $h^{13}$ and 102, wire 103, electro-magnet $k^{18}$, wire 150, contacts 125$^a$ and 124$^a$, wire 146, contacts 145 and $l^{21}$ and thence through arm $l^{20}$ to ground y thus completing a circuit through electro-magnet $k^{18}$ which will cause valve member $k^{11}$ to move downward and bring channel $k^{22}$ into communication with suction port $k^{25}$ resulting in the admission of suction through duct 60' to the end portion $b^*$, atmosphere at the same time being admitted to the end portion $b^{**}$ through port $k^{14}$, channel $k^{13}$ and duct 61'. Accordingly piston $B^{10\prime}$ will move to the left moving arm $l^{20}$ therewith and contact $l^{21}$ will again engage contact 107 thus completing a circuit through the relay $j^{20}$ resulting in the movement of armature $j^{21}$ upward into the before described circuit closing position. Current will flow through wire 103, branch wire 103$^a$, electro-magnet $k^{18}$, wire 137, contacts 131, 125 and 130, wire 119, contacts 111, $h^{16}$ and 110, wire 118, contacts 150, 142 and 149, wire 122, contacts 114, $h^{18}$ and 115, wire 123, contacts 134, 127 and 135, wire 139, electro-magnet $k^{20}$ and through branch wire 103$^c$ thereby completing a circuit and resulting in valve members $k^{11}$ and $k^{13}$ moving downward and thus placing chambers $b^*$ and $c^*$ in cylinders $B^{10\prime}$ and $C^{10\prime}$ under suction through ducts 60' and 62', respectively, atmospheric air being admitted to chambers $b^{}$ and $c^{}$ through ducts 61' and 63 respectively. This will result in downward movement of piston $C^{10\prime}$ and continued movement of piston $B^{10\prime}$ to the left which through connections heretofore described places the gears in second.

When the gears are in second the contact $l^{21}$ engages the contact 147 since arm $l^{20}$ was moved to the left by the arm $D^{10}$ when the shift was made to second. The vehicle being in second gear the motor is further accelerated preparatory to shifting into high which results in a corresponding acceleration of the pump $M^{20}$ and the contact 142 will be moved further to the left in a manner heretofore described.

After having accelerated the motor the operator again disengages the clutch and when the vehicle has attained a predetermined speed the contact 142 will engage contacts 151 and 152 on branch wires 153 and 154, respectively.

Current will now flow through wire 100, contacts 101, $h^{13}$ and 102, wire 103, electro-magnet $k^{19}$, wire 145$^a$, contacts 127$^b$ and 127$^a$, wire 148, contacts 147 and $l^{21}$ and thence through arm $l^{20}$ to ground at $y$ thus energizing electro-magnet $k^{19}$ which in the manner above described will move piston B$^{10'}$ to the right and which in turn will impart a like movement to arm $l^{20}$ and thus again bring contact $l^{21}$ into engagement with contact 107 whereupon the circuit through relay $j^{20}$ will again be closed and armature $j^{21}$ will be moved upward into the before mentioned circuit closing position. Current will now flow from battery Y through wire 100, contacts 101, $h^{13}$ and 102, wire 103, branch 103$^b$, electro-magnet $k^{19}$, wire 138, contacts 133, 126 and 132, wire 21, contacts 113, $h^{17}$ and 112, wire 120, branch 154, contacts 152, 142 and 151, branch 153, wire 122, contacts 114, $h^{18}$ and 115, wire 123, contacts 134, 127 and 135, wire 139, electro-magnet $k^{20}$, branch 103$^c$ and back to wire 103, thus completing the circuit and energizing the electro-magnets $k^{19}$ and $k^{20}$ resulting in the movement of valve members $k^{12}$ and $k^{13}$. The channels $k^{23}$ and $k^{24}$ in members $k^{12}$ and $k^{13}$ will accordingly be placed in communication with suction ports $k^{25}$ and $o^{12}$ respectively resulting in the introduction of suction in the end portions $b^{**}$ and $c^*$ of cylinders B$^{10'}$ and C$^{10'}$ respectively, the opposite end portions $b^*$ and $c^{**}$ being in communication with the atmosphere through ports $k^{14}$, $k^{15}$ and ducts 60' and 63' respectively. The resulting preponderating pressures accordingly will move piston B$^{10'}$ to the right and piston C$^{10'}$ downward and the gears will be moved into high through the connections heretofore described.

When in high gear arm $l^{20}$ engages contact 145.

When it is desired to go from low into reverse the switch member $h^{10}$ is moved through lever $h^{20}$ until the pointer is in the position marked Rev. on the dial $h^{40}$ in which position the bridge contact $h^{12}$ and ground contacts $h^{14}$ on the switch member $h^{10}$ engage contacts 101 and 102 and contacts 156 and 157 on branch wires 158 and 159, respectively. Upon disengaging the clutch and closing switch I$^{10}$ current will flow from battery Y through wire 100, contacts 101, $h^{12}$ and 102, wire 103, electro-magnet $k^{18}$, wire 150, contacts 125$^a$ and 124$^a$, wire 146, contacts 145 and $l^{21}$, arm $l^{20}$ to ground $y$ thus completing a circuit through magnet $k^{18}$ which will in the manner before described place end portion $b^*$ under suction and end portion $b^{}$ under atmospheric pressure whereby piston B$^{10'}$ will be moved to the left resulting in engagement of contacts 107 and $l^{21}$ thereby energizing relay $j^{20}$ and moving armature up with contacts 124 to 127 inclusive in circuit closing relation with contacts 128 to 135 inclusive, and with contact 141 in locking engagement with ground contact 140 to maintain armature $j^{21}$ in this position during the shifting operation. Current will then flow through wire 103, electro-magnet $k^{17}$, wire 136, contacts 129, 124 and 128, wire 117, branch 159 and to ground through contact $h^{14}$ thus completing a circuit through electro-magnet $k^{17}$ resulting in downward movement of valve member $k^{10}$ effecting communication of channel $k^{21}$ with duct $o^{10}$ whereby suction will be admitted to end portion $c^{}$ of cylinder C$^{10}$, atmosphere being admitted to end portion $c^*$ through port $k^{14}$, channel $k^{23}$ and duct 62'.

Current will also flow through wire 103, branch 103$^a$, electro-magnet $k^{18}$, wire 137, contacts 131, 125, 130, wire 119, branch 158 and to ground through contact $h^{14}$ thereby energizing the electro-magnet $k^{18}$ which in the manner before described will place suction in end portion $b^*$ of cylinder B$^{10}$ and atmosphere in end portion $b^{**}$. The relative pressures on pistons C$^{10'}$ and B$^{10'}$ will result in upward movement of piston C$^{10'}$ and leftward movement of piston B$^{10'}$ which through connections previously described will place the gears in reverse.

Having thus described the invention what we believe to be new and desire to secure by Letters Patent, is:

1. Mechanism for shifting the gears of automotive vehicles, comprising a power applying means and means to operate said power applying means to shift the gears at predetermined times in relation to their speeds of rotation, including a master control means, pneumatically operated valves under control of the master control means and operable thereby and prior to the operation of the power applying means to initiate the respective shifting operations and control connections between said master control means and the power applying means, said connections including a member which is automatically adjusted under control of the speed of the vehicle and in turn controls the operations of the power applying means selectively in effecting the various shifts.

2. Mechanism for shifting the gears of automotive vehicles, comprising power applying means, a master control member, a single gear shifting member operated by the power applying means, pneumatically operated valves under control of the master control member and operable thereby and prior to the operation of the power applying means to initiate the respective shifting operations, an adjustable control member, a pump connected to said adjustable control member, means for operating the pump under control of the speed of the vehicle, to thereby adjust said control member at predetermined times in relation to the speed of the gears, and connections including said adjustable control member, between the master control member and the power applying means, selectively controlled by said adjustable member for varying the relative pressures to which the power applying means are subjected in accord with the speed of the vehicle.

3. Mechanism for shifting the gears of automotive vehicles, comprising preparatory means settable to predetermine whether the gears shall be intermeshed for forward or reverse movement of the vehicle, power applying means including pneumatically operated members for connection with the gears to be shifted, a master control means, pneumatically operated valves under control of the master control means and operable to initiate the respective shifting operations, and means under control of the master control means and preparatory means for varying the pneumatic pressures to which said member of the power applying means is subjected in shifting the gears automatically into low or into reverse as predetermined by the setting of said means and to automatically shift the gears from low into second and from second into high when said means has been set for forward movement of the vehicle.

4. A gear shifting mechanism, comprising a preparatory means settable to predetermine whether the gears shall be intermeshed for forward or reverse movement of the vehicle, power applying means, including a pair of pneumatically operated power members having a common connection with the gears to be shifted and respectively moving said connection in directions at right angles with each other, a master control means operable to initiate the respective shifting operations and means arranged to coöperate with said master control means and preparatory means in varying the pneumatic pressures to which said member is subjected in accord with the shifts to be made, including a movable blind operated control member and connections selectively controlled by said member to cause the power applying means to be operated to shift the gears automatically into low or into reverse as predetermined by the setting of said preparatory means, and from low into second and from second into high when said preparatory means has been set for forward movement of the vehicle.

5. A gear shifting mechanism comprising a preparatory means settable to predetermine whether the gears shall be intermeshed for forward or reverse movement of the vehicle, power applying means for connection with the shiftable gears of the transmission mechanism, said power applying means including a pneumatically operable member, a master control means, pneumatically operated valves under control of the master control means and operable to initiate the respective shifting operations, adjustable fluid-operated means to predetermine the times when the shifting operations from low to second and from second to high in accord with the speeds of the vehicle and operative connections controlled by the preparatory means and the master control means for varying the pneumatic pressures to which said members of the power applying means are subjected to thereby shift the gears into low or reverse respectively as predetermined by the setting of the preparatory means and to vary said pneumatic pressures to shift the gears from low into second and from second into high respectively when the preparatory means is set for forward movement of the vehicle.

6. A gear shifting mechanism according to claim 5 in which said operative connections are of pneumatic nature.

7. A gear shifting mechanism according to claim 5 in which said operative connections include electrically controlled pneumatic means for operating the means for varying the pneumatic pressure.

8. Mechanism for shifting the gears of an automotive vehicle, comprising preparatory means settable to predetermine whether the gears shall be intermeshed for forward or reverse movement of the vehicle, power applying means including pneumatically operated members for connection with the gears to be shifted, a master control means, pneumatically operated valves under control of the master control means and operable to initiate the respective shifting operations and control connections arranged to cooperate with said master control means and preparatory means in selectively varying the pneumatic pressures to which said members are subjected, said control connections including movable control members and means selectively controlled by said movable control members to cause said pneumatically operated members to operate to shift the gears automatically into low or into reverse as predetermined by the setting of said preparatory means and speed controlled fluid means for setting the gears preparatory to shifting from low into second and from second into high when said preparatory means has been set for forward movement of the vehicle.

9. Mechanism for shifting the gears of automotive vehicles, comprising a preparatory means settable to predetermine whether the gears shall be intermeshed for forward or reverse movement of the vehicle, pneumatically operable power applying means for connection with the gears to be shifted, a second means connected to the preparatory means and operative to initiate the respective shifting operations, and pneumatically operated means under control of the second means and cooperating with the preparatory means for varying the relative pneumatic pressures to which the power applying means is subjected in effecting the several shifting operations, including a fluid propelling member under control of the speeds of the vehicle to cause the shifting operations to be accomplished when the gears to be intermeshed are rotating at substantially the same speed.

10. A gear shifting mechanism according to claim 5 in which said operative connections include electrically controlled pneumatic means for operating the means for varying the pneumatic pressures, the preparatory means comprising a normally operated rotative member having electrical contacts in its outer surface for selectively controlling corresponding electrical circuits included in the means which cooperate with the preparatory means in varying the relative pressures to which the power applying means is subjected.

11. A gear shifting mechanism for automotive vehicles, comprising power applying means having a common member for connection with the gears to be shifted, and a pair of pneumatically operated members connected to the first mentioned member and respectively operative for moving the same longitudinally and one end of the same laterally, a master control means operable to initiate the respective shifting operations and means including power pneumatic members for automatically varying the pneumatic pressures to which said pneumatically operated members of the power applying means are subjected in effecting the various shifts.

12. A gear shifting mechanism comprising pneumatically operable power applying means for connection with the gears to be shifted, a series of valvular units including pneumatically operated valves, means connecting said valvular units with the power applying means and through which the latter is operated to variably control the pneumatic pressures to which said power applying means is subjected in effecting the shifting operations, a master control means, a preparatory means adjustable to predetermine whether the movement of the vehicle shall be forward or rearward, connections between said preparatory means and the master control means and connections between said preparatory means and said valvular units and through which the latter are selectively operative in accord with the shift to be made.

13. A gear shifting mechanism according to claim 12 in which the connections between said preparatory means and said valvular units includes a first member, a second member and a third member, interconnected with each other for interdependent operations with respect to the valvular units, the first member being connected to the power applying means and having separate connections to the second and third members, respectively, said second member being longitudinally movable in causing selective operation of said valvular units, under control of the third member in certain operations and controlling said third member, and thereby the first member, through the power applying means, in certain other operations.

14. A gear shifting mechanism comprising a master control means, pneumatically operable power applying means for connection with the gears to be shifted, an adjustable preparatory member having connection with the master control means, a series of valvular units including pneumatically operated valves operable independently of and prior to the power applying means, means connecting one of said valvular units with the preparatory member, means connecting the other valvular units with said preparatory member and through which the latter units are selectively operated in accord with the shift to be made, and pneumatic connections between the latter valvular units and the power applying means.

15. A gear shifting mechanism according to claim 14 in which the means connecting the preparatory member with said other valvular units and through which the latter are selectively operated, includes a first member, a second member and third member interconnected with each other for interdependent operations with respect to said valvular units, the first member being connected to the power applying means and having separate connections to the second and third members respectively, said second member being longitudinally movable in causing selective operation of said valvular units, under control of the third member in certain operations and controlling said third member, and thereby said first member, through the power applying means, in certain other operations.

16. A gear shifting mechanism according to claim 14 in which the means connecting said other valvular units with said preparatory member and through which the latter units are selectively operated in accord with the shift to be made includes a control member and a pump for operating said control member in accord with the speed of the vehicle.

17. A gear shifting mechanism according to claim 14 in which the means connecting said other valvular units with said preparatory member and through which the latter units are selectively operated in accord with the shift to be made includes an adjustable control member, a hydraulic pump under control of the speed of the vehicle and means operated by said pump and connected to said member for adjusting the latter.

18. A gear shifting mechanism according to claim 14 in which the means connecting said other valvular units with said preparatory member and through which the latter units are selectively operated in accord with the shift to be made includes an adjustable control member, a fluid pump under control of the speed of the vehicle and means operated by said pump and connected to said member for adjusting the latter.

19. A gear shifting mechanism comprising a power applying means including a longitudinally and pivotally movable member one of whose ends is arranged for connection with the gears to be shifted and also including operating members connected to the first mentioned member and respectively operative thereon to impart longitudinal and pivotal movement thereto, in shifting the gears from neutral into low or into reverse and from low through neutral into second and from second into high, a preparatory means settable to predetermine the shifting operation into reverse or into low from neutral and control connections between said preparatory means and the operating members of the power applying means, including a member which is movable to prepare the connections for the shifting operations into second and into high and a pump under control of the speed of the vehicle and connected to the latter member to move the same into different positions for the respective shifting operations into second and into high at predetermined times in relation to the speed of rotation of the gears.

20. A gear shifting mechanism according to claim 19 in which the operating members of the power applying means are each of pneumatically operable nature and are respectively connected to opposite ends of the longitudinally and pivotally movable members, and in which the connections between the preparatory means and said operating members include a series of valvular units which selectively control the relative pressures to which said operating members are subjected in effecting the shifting operations.

21. A gear shifting mechanism for vehicles comprising a gear shifting element, a clutch pedal, a master control means under control of the clutch pedal, pneumatically operable power applying means for moving the gear shifting element longitudinally, pneumatically operable power applying means for moving the gear-shifting element laterally, pneumatically operated means for selectively controlling the lateral and longitudinal power applying means, a speed controlled means and connections between the master control means, the speed controlled means and the power applying means to operate the power applying means when the clutch pedal is pressed down, if and when the speed of the vehicle moves the speed controlled means, to a predetermined setting in accordance with the speed at which it is desired the shift shall take place.

22. A gear shifting mechanism for vehicles comprising a gear shifting element, a clutch pedal, a master control means under control of the clutch pedal, pneumatically operable power applying means for moving the gear shifting element longitudinally pneumatically operable power applying means for moving the gear shifting element laterally, a speed controlled means and electro-magnetic connections between the master control means, the speed controlled means and the power applying means to operate the power applying means when the clutch pedal is pressed down, if and when the speed of the vehicle moves the speed controlled means, to a predetermined setting in accordance with the speed at which it is desired the shift shall take place said electro-magnetic connections comprising an electromagnetic multiple switch for selectively setting the parts for operation, at will, for neutral, reverse or for one of the forward settings.

23. A gear shifting mechanism comprising pneumatically operable power applying means for connection with the gears to be shifted, a series of valvular units, means connecting said valvular units with the power applying means and through which the latter is operated to variably control the pneumatic pressures to which said power applying means is subjected in effecting the shifting operations, a clutch pedal, a master control means under control of the clutch pedal, a preparatory means adjustable to predetermine whether the movement of the vehicle shall be forward or rearward, connections between said preparatory means and the master control means and connections between said prepartory means and said valvular units and through which the latter are selectively operative to accord with the shift to be made, said preparatory means including an electro-magnetic multiple switch for selectively setting the parts and speed controlled means preventing shifting of the gears between low, intermediate and high gears unitl the vehicle has reached a predetermined speed.

TOLBERT F. CHEEK.
LOUIS G. COLLYER.